United States Patent [19]
Carter et al.

[11] Patent Number: 5,797,425
[45] Date of Patent: Aug. 25, 1998

[54] THREE STAGE GAS PRESSURE REGULATOR

[75] Inventors: Stephen A. Carter; Michael A. Knappers. both of Mississauga, Canada

[73] Assignee: Sherex Industries, Ltd., Ontario, Canada

[21] Appl. No.: 563,391

[22] Filed: Nov. 28, 1995

[51] Int. Cl.$^6$ ................................... G05D 16/06
[52] U.S. Cl. .................. 137/505.46; 137/505.12; 251/243
[58] Field of Search ............. 137/505.46, 505.47, 137/505.12; 251/243

[56] References Cited

U.S. PATENT DOCUMENTS

| | | | |
|---|---|---|---|
| 1,114,043 | 10/1914 | Ricketts | 137/505.46 |
| 1,264,006 | 4/1918 | Bucknam | |
| 1,842,236 | 1/1932 | Bastian | |
| 1,883,690 | 10/1932 | Gilgenberg | |
| 2,057,133 | 10/1936 | Bryce et al. | 50/23 |
| 2,057,150 | 10/1936 | Kehl et al. | 50/23 |
| 2,280,390 | 4/1942 | Ensign | 251/243 X |
| 2,302,284 | 11/1942 | Abbott | |
| 2,306,060 | 12/1942 | Jacobsson | 221/73.5 |
| 2,362,352 | 11/1944 | Buttner | 50/23 |
| 2,794,321 | 6/1957 | Warner et al. | 62/1 |
| 2,819,728 | 1/1958 | Gage et al. | 137/505.39 |
| 2,824,186 | 2/1958 | Binford | 200/83 |
| 3,023,093 | 2/1962 | Hughes | 48/191 |
| 3,176,709 | 4/1965 | Jones | 137/340 |
| 3,211,175 | 10/1965 | Replogle | 137/493 |
| 3,443,583 | 5/1969 | Webb | 137/505.12 |
| 3,960,126 | 6/1976 | Shinoda | 137/505.47 X |
| 4,276,902 | 7/1981 | Roth | 137/505.18 |
| 4,541,454 | 9/1985 | Sturman et al. | 137/505.41 |
| 4,744,387 | 5/1988 | Otteman | 137/505.41 |

FOREIGN PATENT DOCUMENTS 1326794  2/1994  Canada.

*Primary Examiner*—Stephen M. Hepperle
*Attorney, Agent, or Firm*—Nields, Lemack & Dingman

[57] ABSTRACT

The present invention provides a supplementary pressure regulator that can be used with conventional single or multi-stage pressure regulators. It may also conveniently be used with a novel two stage balanced pressure regulator to form a three-stage vacuum demand pressure regulation system which may be used to regulate the pressure of compressed gases used as fuel in engines, such as natural gas used in natural gas powered vehicles. The pressure regulator of the present invention is a robust, compact, high flow, low droop, low pressure drop, low set-point drift and low creep regulator which is suitable for both OEM and after market use. It is particularly useful in mono-, bi-, and dual fuel engine applications.

7 Claims, 17 Drawing Sheets

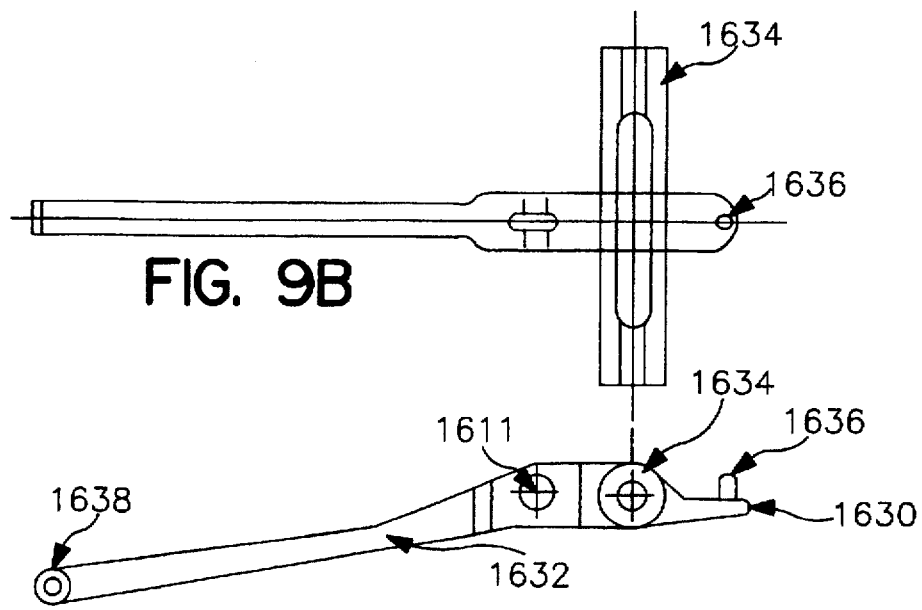
FIG. 9B
FIG. 9A
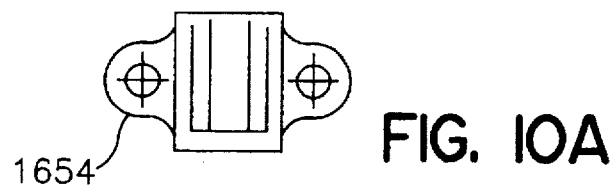
FIG. 10A
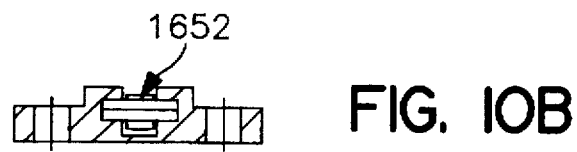
FIG. 10B

THREE STAGE GAS PRESSURE REGULATOR

The present invention relates to a novel pressure regulator which is particularly useful as part of a vacuum demand pressure regulation system used to control and regulate the pressure of compressed natural gas or propane in engines fuelled with these fuels. It may be used as a supplementary pressure regulator with conventional single or multi-stage pressure regulators, or as the third stage of a novel, three-stage pressure regulator.

BACKGROUND OF THE INVENTION

It is becoming increasingly common to use so-called alternate fuels, such as propane or natural gas, in internal combustion engines. Vehicles which are manufactured to operate on a primary fuel such as gasoline may be converted to operate on one of two or more alternate sources of fuel, such as propane or natural gas. In some such conversions, the operator has the ability to switch between fuel sources depending on the availability and price of these fuels.

While the vehicles which are converted to run on these alternate fuels have in most cases been manufactured with storage tanks for gasoline, pumps for moving the gasoline from the tank to the engine, and carburettors or fuel injectors for introducing the fuel and the required amount of air for combustion into the engine, it is generally necessary to add to the vehicle being converted the components required to store the alternate fuel, and to move it in the required quantities and at the desired pressure to the engine of the vehicle.

Gaseous fuels such as propane and natural gas useful as alternate fuels are generally stored in pressurized cylinders in which the gas is compressed into a manageable volume. Increasing the pressure to the highest level that can safely be handled by a pressurized storage cylinder increases the amount of fuel that can be stored in that cylinder, and extends the distance that the vehicle can be driven before refuelling. Typical storage cylinder pressures range from 2000 to 5000 lbs./in.$^2$. While the pressure within the storage cylinder in most cases provides the force necessary to move the fuel to the engine, internal combustion engines cannot operate at the high pressures typically found in the storage cylinder. The pressure of the gas must be reduced to a level at which the engine can be operated safely, and maintained at a relatively constant reduced pressure to ensure efficient operation of the engine. In addition, it is often desired to provide a vacuum demand fuel system for such vehicles, in which the fuel is introduced to the engine at substantially the same pressure as the combustion air. In such a system, the fuel is not forced into the engine by a pump or by pressure, but is drawn into the engine by a reduction in the pressure of the combustion air as that air is drawn into the engine. In such a system it is important to ensure that the relative pressures of the air and fuel remain constant to ensure proper air and fuel ratio in the engine.

Consequently, the fuel pressure must be regulated as it is reduced to minimize the effect of those factors that affect the output pressure from the pressure regulation system, and to ensure that the pressure of the fuel entering the engine is constant even as the pressure in the storage cylinder is reduced. At the same time, the pressure regulation must permit as much fuel as possible to be removed from the storage cylinder, and thus must permit the pressure in the storage cylinder to fall as close to the engine operating pressure as possible, while still providing the force required to move the gaseous fuel through the pressure regulation system and into the engine.

Conventional pressure regulators having one or more stages, over which the pressure of the regulated gas is reduced are well-known and have long been used to reduce the pressure and regulate the flow of compressed gases. Some of these conventional pressure regulators are known as pressure-balanced regulators. These typically use various arrangements of springs, diaphragms and machined parts to balance pressures and fluid flow over the various stages of the regulator.

For example, U.S. Pat. No. 2,794,321 issued Jun. 4, 1957 to F. J. Warner et al discloses a single stage fuel pressure regulator said to be useful in reducing and regulating the pressure of fuels such as propane for use as fuel in an internal combustion engine.

Some pressure regulators, such as those commonly used on tanks of compressed gas such as oxygen or acetylene, are designed to permit the operator to adjust the pressure drop across each stage. Others, such as those typically used in fuel supply systems, are pre-set and permit either no adjustment, or only "fine tuning", of the output pressure by the operator, although more extensive adjustments by authorized service personnel can be made.

The pressure regulators of the prior art suffer from a number of disadvantages that the supplementary pressure regulator of the present invention is intended to overcome.

One of the principal problems associated with pressure regulators of the prior art is referred to as "droop", i.e., the degree of uncertainty about the output pressure of the regulator. This degree of uncertainty is a function of the fuel flow rate and the pressure in the storage cylinder. "Droop" may create problems in the proper operation of an engine because, for example, the fuel injectors commonly used on modern vehicles are intended to operate at a constant fuel pressure, and the typical carburetion venturi mixer requires the pressure of the fuel to match the pressure of the air to ensure proper fuel-air mixture control. Previously proposed solutions to these problems involve the use of temperature and pressure senders to detect variations in the fuel temperature and pressure, and make appropriate adjustments to the operation of the engine. The present invention is intended to overcome or reduce the problem of "droop" without requiring adjustments to the operation of the engine.

Another problem is "creep", the increase in pressure within the regulator, and downstream from the regulator, when the injector is turned off or the shut-off solenoid is closed for carburetted engines, i.e., the fuel supply to the engine is intended to be shut off. This is sometimes referred to as zero-flow rate pressure rise, and is caused by imperfect sealing of the regulator components including the fuel shut-off solenoid. While creep may be reduced by increasing the sealing forces within the regulator, such an increase often requires modifications to the structure of the regulator not only to apply these higher forces but also to balance them, to ensure that the regulator can be opened easily when the supply of fuel to the engine is to be restarted.

Associated with this zero-flow-rate pressure rise is leakage of fuel from the regulator to the atmosphere.

Another problem with regulators of the prior art is set-point drift, namely the degree of uncertainty about and variation in the output pressure of the regulator due to changes in operating temperature, or engine fuel or air flow requirements. Set-point drift may create problems in the proper operation of the engine as, for example, the carburetion venturi mixer requires the pressure of the fuel to match the pressure of the air to ensure proper fuel-air mixture control.

The flow of fuel from a storage cylinder to a pressure regulator is typically controlled by a solenoid-controlled valve that may be mounted on the regulator itself, and that may be opened by the operator of the vehicle just before the engine's ignition system is switched on. The solenoid controlled valve typically opens against the storage cylinder pressure and, as it opens, fuel flows through the regulator to the engine. In regulator assemblies of the prior art, it may take several seconds for full fuel flow to be available for the engine's fuel injector, and for the desired operating pressure to be reached at the fuel injector. Unless the operator of the vehicle waits for this interval before switching on the ignition, the vehicle may not start properly, or may not start at all.

In the spring-diaphragm based regulators of the prior art, the output pressure is a function of a large number of variables including the input pressure to the regulator, the output flow rate, the characteristics and properties of the diaphragm, including its area and stretch, the reference pressure, the orifice area and shape, the pintle area and shape, the spring rate, and the operating temperature. Changes in these variables result in fluctuations in the output pressure, and require the output pressure of such regulators to be set at a level higher than the optimum level to ensure that there is at all times a positive fuel flow to the engine. This may result in operating inefficiencies and higher than necessary emission levels. In addition, while the regulator may be set to provide optimum idling conditions, the effect of these variables may cause delays in the return of the regulator to those optimum conditions after extended high speed operation, typically leading to stalling of the engine.

Conventional vacuum demand pressure regulation systems are extremely sensitive to changes in the reference pressure, particularly under idle conditions. Minor variations in the reference pressure, unless responded to quickly, can cause an error in the reference pressure at the regulator with respect to air inlet pressure to the engine. This reference pressure error can cause the carburetion venturi mixer to react poorly due to a mismatch in the pressure of the air and fuel. It can also lead to fuel supply shut-off to the engine and possible engine stalling.

Thus, it is an object of the present invention to provide an improved pressure regulator which is adapted to provide fast response and maximum sensitivity to changes in the inlet pressure, and which minimizes fluctuations in the outlet pressure.

It is also an object of the present invention to provide an improved pressure regulator adapted to open quickly even against high storage cylinder pressures, thus allowing the regulator to reach operating pressures almost immediately.

Another object of the present invention is to provide a pressure regulation system that minimizes the cylinder pressure necessary for efficient operation of the fuel pressure supply system, and thus permitting longer operation of the vehicle before refuelling.

SUMMARY OF THE INVENTION

The present invention provides a supplementary pressure regulator that can be used with conventional single or multi-stage pressure regulators. It may also conveniently be used with a novel two stage balanced pressure regulator to form a three-stage vacuum demand pressure regulation system which may be used to regulate the pressure of compressed gases used as fuel in engines, such as natural gas used in natural gas powered vehicles. The pressure regulator of the present invention is a robust, compact, high flow, low droop, low pressure drop, low set-point drift and low creep regulator which is suitable for both OEM and after market use. It is particularly useful in mono-, bi-, and dual fuel engine applications.

The improved supplementary pressure regulator of the present invention minimizes the effect of several of the factors that affect the stability of the output pressure of the regulator by providing optimized balancing of several of the components of the regulator. The pintle assembly of the supplementary pressure of the present invention is balanced to eliminate the effect of input pressure, which is one of the most significant contributors to overall droop. The use of a balanced regulator in the present invention allows a much smaller regulator to achieve the desired droop level. Smaller regulators generally have faster response and are, in general, cheaper to make than larger regulators performing the same function.

The supplementary pressure regulator of the present invention provides fast transient response to fluctuations in the inlet pressure.

The supplementary pressure regulator of the present invention comprises a substantially hollow body having a substantially pressure-tight diaphragm disposed therein. The body is conveniently comprised of two body members having, when assembled, abutting edges, which may be fastened together by any conventional means to form the regulator body. The diaphragm may conveniently be retained in place between the abutting edges of the two body members. The ratio of the surface area of the diaphragm to the interior volume of the regulator is substantially higher than commonly found in pressure regulators of the prior art. One side of the diaphragm is exposed by means of a reference port to a generally constant reference pressure that may be atmospheric pressure, or which, in the case of turbo-charged engines, may be the pressure existing at the point that the air and fuel are mixed. The other side of the diaphragm is exposed by means of a fuel inlet port to a flow of gas at a regulated pressure that is intended to be relatively constant with respect to the reference pressure and, in the case of the preferred embodiment, is intended to be substantially equal to that reference pressure.

Mounted on the regulator body are shut-off solenoid means to open and close the flow of pressurized gas from the regulator inlet to the regulator body, and cranking and idling solenoid means to permit the flow of fuel from the regulator inlet to the engine during starting and idling conditions. A pressure regulating pintle assembly is disposed between the gas inlet to the regulator and the regulator body to control the flow of gas through the regulator, and is connected to the diaphragm to form a pressure regulating assembly within the regulator body.

The shut-off solenoid means may be integrally constructed with the pressure regulating pintle assembly to ensure complete closing of the regulator when the regulated fuel supply is shut off, and to provide a compact and space-efficient assembly.

The pressure-regulated side of the diaphragm is in fluid communication with the engine to which the pressure regulated fuel is directed. While the engine is operating, the fuel inlet to the engine is generally at a pressure lower than the regulated pressure within the body of the regulator, due to the movement of combustion air to the engine past this fuel inlet.

In a preferred embodiment of the present invention, the reference pressure is the pressure of the air supply source, (which may be atmospheric or turbo-charged) and the fuel pressure at the regulator outlet is intended to be substantially equal to that reference pressure. In the operation of the engine, combustion air is either drawn or forced into the engine, and the flow of air through an inlet venturi results in a lower pressure at the venturi throat that causes the pressure-regulated gas to flow from the regulator into the engine.

The diaphragm is reinforced by at least one backing plate centrally mounted on one side of the diaphragm, preferably the regulated side. The backing plate is pivotally connected to the pintle valve assembly which regulates the flow of gas through a pintle orifice into the chamber of the regulator. As the regulated pressure varies from the reference pressure, the diaphragm moves to the lower pressure side of the regulator. This movement causes the pintle valve assembly to move within the pintle orifice, and changes the size of that orifice and the rate at which the pressurized gas flows into the regulated side of the regulator body. This change in flow rate restores the pressure balance within the regulator body. A second backing plate may be provided on the reference pressure side of the diaphragm. The shape of the pintle and of the pintle orifice may be changed to provide for the most efficient flow of pressurized gas around the pintle assembly and through the pintle orifice.

While one or two backing plates are used to reinforce the center area of the diaphragm and to provide a means for connecting the diaphragm to the pintle assembly, it will be understood that the backing plates must be sufficiently smaller in diameter than the diaphragm to permit proper movement of the diaphragm within the regulator body.

Several of the components of the supplementary regulator of the present invention have novel designs which permit the regulator to achieve the objects of the invention.

The novel pintle assembly of the present invention utilizes an all-metal pintle in its preferred embodiment to minimize fluctuations in, and drift of, the regulator set point, i.e., the predetermined output pressure, due to variations in operating temperatures and engine fuel and engine air flow rates. In addition, it incorporates an integral solenoid to seal the pintle orifice during zero flow conditions.

The pintle assembly may be connected to the diaphragm by means of a lightweight die cast or plastic lever, thus providing a relatively high pintle-to-diaphragm force ratio, which in the case of the preferred embodiment may be in the range of about 6:1. The lever may be connected to the pintle by a suitable pivot means, such as a spring loaded slip joint. The pintle assembly may be connected to the diaphragm via a block of low friction, low mass material such as Zytel, which allows relatively easy lateral movement of the diaphragm with respect to the lever.

The diaphragm backing plates may conveniently be formed of aluminium stampings and thus can be substantially thinner than those used for regulators of the prior art.

The ability to use a relatively thin backing plate is achieved through the use of a diaphragm stop ring on the interior side of the regulator body, and by incorporating suitable pivot means such as a spring loaded slip joint between the pintle stem and the pintle pin. The stop ring contacts the backing plate and supports the regulator diaphragm in its most extreme, or full strike, position, which generally occurs when the engine is being fuelled with the primary fuel source, such as gasoline. In that situation, there is a full venturi vacuum applied to the diaphragm, but no fuel flowing into the regulator body to replace the air removed by the vacuum. The diaphragm and backing plate move to the regulated side of the regulator and contact the stop ring which limits the displacement of the diaphragm while only minimally reducing the volume of the regulator body.

In the case of overpressure in the regulator, which may occur in the event of an engine backfire or upon rapid closing of the throttle, the spring loaded slip joint between the pintle stem and pivot allows the diaphragm to bottom out against the lower cover, thereby significantly reducing the strength requirement of the diaphragm lever and backing plates.

The diaphragm cavity and cover plate may be designed to embody an appropriate safety factor over the normal operating pressure within the regulator which is typically about 25 psig.

The supplementary pressure regulator of the present invention provides a shut-off solenoid assembly, including a solenoid piston, which is an integral part of the third-stage pintle arrangement. The solenoid piston provides a guide for the pintle when it is in the open position and seals the pintle orifice against the flow of gas when it is in the closed position. This novel arrangement permits the use of a lower amp-turn coil, as explained below, as the pintle return spring provides an opposing force to the pressure force which is applied to the solenoid piston seal.

The solenoid piston is so arranged that, when the solenoid is energized and the solenoid piston is open, it applies no force to the pintle, which is maintained in a balanced position by the opposing forces of the gas pressure and the regulator springs of the pintle assembly.

When the solenoid is de-energized, the force of the springs forces the solenoid down against the pintle, forcing it to contact the orifice, and thus stopping the flow of the fuel through the pintle orifice. Once the solenoid seals off the pintle orifice, the pressure which acts on the pintle in the open position is gone, and the regulator spring provides a force, against the solenoid closing force, and in the opening direction of the solenoid, thereby reducing the magnetic force required to open the solenoid.

In some applications of the pressure regulator, a shut-off solenoid assembly may not be required, and a plug may be used to close the pintle cavity and provide support for the pintle.

The supplementary pressure regulator of the present invention may incorporate an adjustable orifice, sometimes referred to as a power valve, to regulate the flow of fuel through the regulator outlet. The power valve may conveniently utilize a threaded shaft by means of which a valve disc may be moved up and down either manually or by means of a suitably powered motor, within the power valve to adjust the size of the regulator outlet.

The supplementary pressure regulator of the present invention may also incorporate an idle solenoid assembly and a cranking solenoid assembly, each of which may be supplied with fuel directly from the inlet of the supplementary regulator of the present invention by means of a drilling or other aperture from the pintle cavity. Each of the idle solenoid and cranking solenoid assemblies may contain substantially the same solenoids. Both the cranking and idle orifices may be machined into the regulator body to minimize the cost of production. In addition, both solenoid cavities are designed for the identical solenoid core tube that is used in all solenoid applications throughout the regulator. This core tube consists of a magnetic flange and stop, and a non-magnetic sleeve. All three parts, i.e. stop, flange and sleeve, are brazed together to provide a substantially gas tight seal capable of withstanding at least about four times the maximum operating pressure normally found in the regulator under normal service conditions.

In some embodiments of the invention, it may not be necessary to use an idle solenoid or a cranking solenoid, or either of them. When either or both of them are not required, the orifice may be sealed with a suitable plug, thus permitting use of a standardized regulator body for a variety of applications.

While the improved supplementary pressure regulator of the present invention may be used in association with conventional single or multi-stage pressure regulators, it may be most effectively used with the novel two-stage pressure regulator disclosed in copending U.S. patent application Ser. No. 2,131,108.

The novel two-stage regulator disclosed in that application provides first and second stages designed to minimize the mass of the dynamic components to provide faster response to changes in operating conditions in the regulator. Each of the two stages utilises two counter wound springs to minimise the spring constant and the height of the spring tower required. All of the dynamic first stage components, with the exception of the pintle, may be constructed of aluminium, or other lightweight materials having appropriate strength and thermal conductivity properties.

A rolling diaphragm is used in each of the first and second stages to maintain a constant effective area throughout the entire range of movement of the diaphragm. Such a diaphragm has greater durability, and allows higher manufacturing tolerance, than a flat diaphragm, and to a large extent eliminates the hysteresis effect of flat diaphragms. A diaphragm of this configuration has an exceptionally long operating life, and good cold weather performance and durability.

In that regulator, the first stage spring tower is sealed from the environment, and referenced to the pressure in the second stage.

Each of the first and second stages includes a novel pintle assembly designed to eliminate potential leak paths.

The construction of each of the first and second stages of that particular regulator are substantially identical, with the exception of the arrangement of the particular pintle seal used, and the details of the spring tower construction. A captured O-ring may be used for the second stage pintle seal, since that seal is exposed to a maximum pressure of only about 170 psig. The second stage spring tower may contain a pressure adjustment screw, which permits the adjustment of the pressure in the second stage, and thus the output pressure from the first two stages of that regulator.

The pressure regulator of the aforementioned co-pending application may be provided with a pressure relief valve which is intended to operate in the event of a failure of the first regulator stage. The pressure relief valve ("PRV") is provided between the first and second stages and consists of a low mass piston, a PRV spring and a PRV tower. Once a pre-determined pressure in the PRV is reached, and the piston is displaced and forced wide open, providing immediate pressure relief.

The two-stage regulator provides temperature controlling fluid passageways to control the temperature of the regulated gas and to compensate for the heat loss as the gas expands. The supplementary regulator of the present invention provides compensation for fluctuating gas temperatures through the use of the optional power valve.

The two-stage pressure regulator disclosed in the aforementioned co-pending application requires only minor modifications to be used with the supplementary pressure regulator of the present invention and is the basis of the three-stage regulator design. The regulator body requires some minor machining modifications. The most significant modification is that the outlet passage is left undrilled, and a new outlet and O-ring face seal gland is added to the left face. In addition, the original mounting screw locations on the left face are no longer used; instead, mounting threads are added adjacent to the face seal gland. Provision for an optional coolant solenoid may be added to the back face; this requires one additional drill and plug in an appropriate location in the regulator body. The first and second stage springs may be replaced with lower force springs in order to produce the required first and second stage pressure of 60–170 psig and 23–26 psig, respectively, for use in association with the supplementary pressure regulator of the present invention.

The supplementary pressure regulator of the present invention when used with the two stage regulator provides a three-stage regulator that is much more compact than regulators of the prior art.

In operation, the pressurized gas, which may be stored at a pressure of 150 psig up to 5000 psig, passes through a preliminary pressure regulation system, which may be that disclosed in the aforementioned patent application. The pressure of the gas is reduced to a regulated pressure within a relatively narrow range, which may typically be about 21 to 28, or more preferably 23–26, psig (or such other pressure as might be chosen and maintained by appropriate spring rate selections).

The natural gas or other fuel flows at this reduced pressure into the passageway connecting the pressure regulator of the present invention, and, provided the shut-off solenoid is open, may flow from there through the pintle orifice to the interior of the regulator body. If the shut-off solenoid is closed, it may flow through the cranking supply passageway to the cranking and idle solenoid assemblies. The interface between the preliminary pressure regulation system and the pressure regulator of the present invention may be designed to ensure the most efficient movement of gas between the two regulators.

Under normal operating conditions, as the gas starts to flow the solenoid opens and permits the pintle assembly to move, opening the pintle orifice. To ensure rapid opening of the pintle, means may be provided to permit the gas to flow directly to the regulator body to assist in the opening of the pintle, by balancing the pressure on either side of the pintle and to provide a positive, pressurized fuel flow to the engine.

Under cranking and idling conditions, fuel flow to the engine is low, and sudden is variations or pulsations in the reference pressure may cause a temporary closure of the pintle orifice. Accordingly, optional, separate cranking and idling assemblies are provided to accommodate those circumstances. The cranking assembly includes an electrically controlled solenoid to that opens to permit fuel to flow directly to the engine on start-up. The solenoid may be controlled electronically to pulse the cranking solenoid at the rate needed to deliver fuel at the required rate, such that the output pressure from the regulator is maintained at substantially the same pressure as the reference pressure. As the cranking solenoid receives the fuel from the inlet of the supplementary pressure regulator, its output is not affected by changes occurring at start-up in the supplementary pressure regulator.

To ensure proper supply of the fuel to the engine in all operating conditions, and regardless of the nature of the first pressure regulator, the pressure regulator of the present invention may be arranged to provide a positive idle fuel flow to the engine to ensure proper operation of the engine under idling conditions.

The idle circuit uses a solenoid assembly to provide means to provide a ensure a constant, mechanically adjustable positive fuel flow to the engine under idle conditions. As this circuit is also sourced from the second stage pressure, its output is also immune to instantaneous disturbances in the third stage output or reference pressures.

BRIEF DESCRIPTION OF THE DRAWINGS

FIGS. 9A and 9B are plan and front views, respectively, of the pintle lever used in the pintle assembly of the present invention.

FIGS. 10A and 10B are plan and section views, respectively, of the sliding coupling used in the pintle assembly of the present invention.

DESCRIPTION OF THE PREFERRED EMBODIMENT

In one of its preferred embodiments, the supplementary pressure regulator of the present invention is used in combination with a balanced two-stage pressure regulator, and may be constructed to receive and support such a pressure regulator. The construction and operation of the supplementary pressure regulator of the present invention will be described with particular reference to that contemplated use, although it will be understood by those skilled in the art that the construction may be modified to accommodate the use to which the supplementary pressure regulator of the present invention may be put, and the pressure regulators it will be used with.

Figure 1:
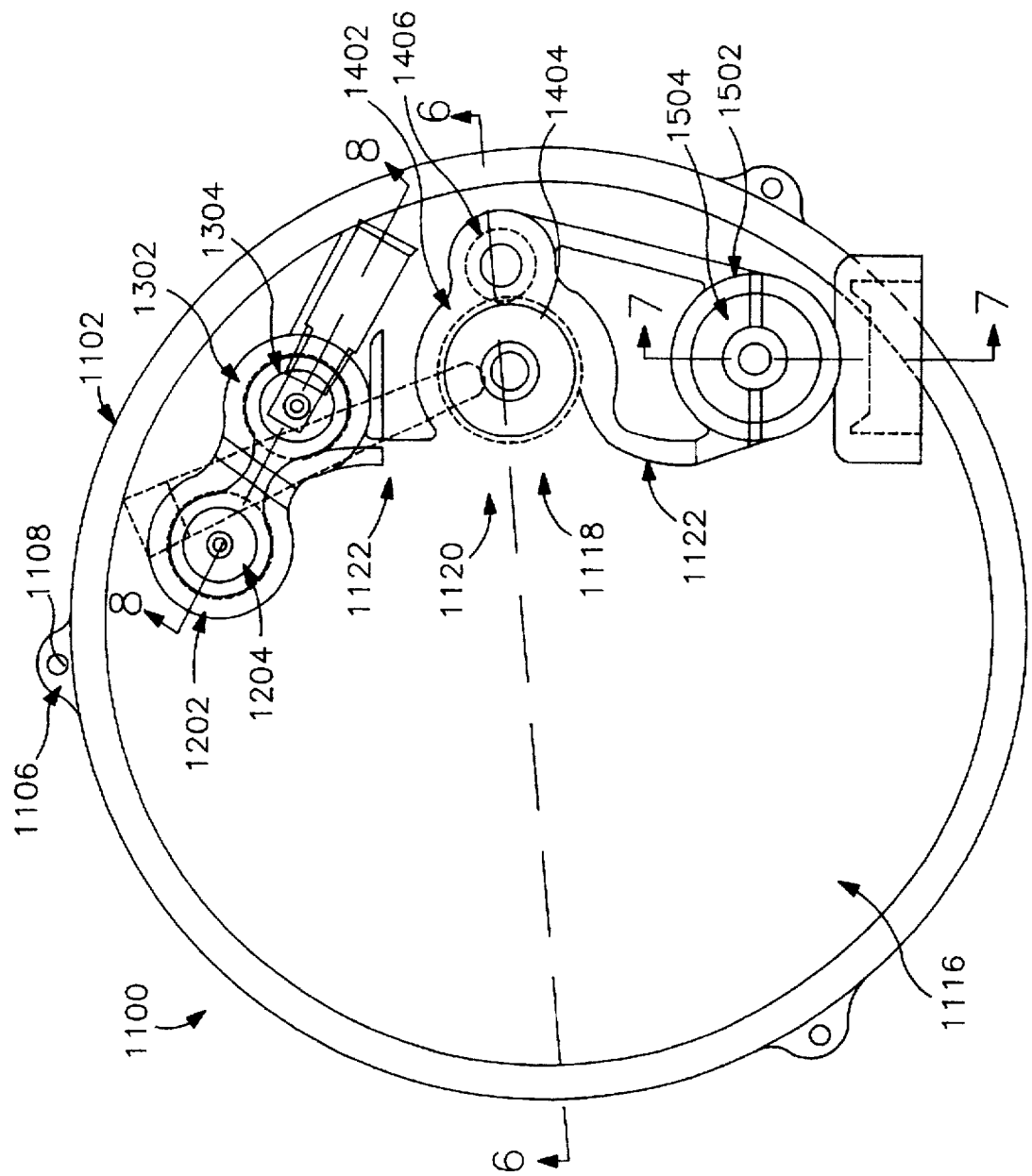
FIG. 1 is a top, partially sectional view of the body of the pressure regulator of the present invention, shown in its preferred embodiment as the third stage of a three-stage pressure regulator.

Shown in FIG. 1 is a partially sectional view of the body 1102 of the pressure regulator of the present invention, which is generally designated as 1100. In this preferred embodiment of the invention, the regulator body has an upper surface 1116, which may be adapted to cooperate with or engage a single or multi-stage pressure regulator such as the two-stage pressure regulator shown in co-pending co-pending Canadian patent application No. 2,131,108. Rising vertically from the surface 1116 of the regulator body is a mounting surface 1118, in which are formed a plurality of mounting bosses 1122, which are adapted to permit secure fastening of, for example, the two-stage pressure regulator as described above, to the third-stage body, by any conventional, appropriate means. Formed within the vertical surface 1118 is a fuel inlet port in the form of a transfer passageway 1120 through which the gas to be regulated may pass, from the principal pressure regulator to the interior of the supplementary pressure regulator of the present invention.

Arranged on the outside surface of the regulator body 1102 are a cranking solenoid tower 1202 and an idle solenoid tower 1302. In the embodiment of the invention shown in FIG. 1, a cranking solenoid cavity 1204 is formed in the solenoid tower 1202 and an idle solenoid cavity 1304 is formed in the solenoid tower 1302. In addition, there is a shut-off solenoid tower 1402, in which is formed a shut-off solenoid cavity 1404, and a pressure adjustment tower 1406. Also arranged on the upper surface 1116 of the regulator body 1102 is a power valve adjustment tower 1502, and a power valve tower extension (not shown), which has a mounted therein, or integrally assembled therewith, a power valve outlet 1506.

In the embodiment shown in FIG. 1, the components of the cranking, idle and shut-off solenoid towers, and of the pressure adjustment tower, may be assembled from the exterior surface of the regulator body and affixed to the body by conventional means.

Around the periphery of the body are mounting lugs 1106, which have in them apertures 1108 adapted to receive screws, bolts or the like (not shown).

The body 1102 and the bottom cover 1104 of the supplementary pressure regulator of the present invention may be made or formed by any conventional means, such as moulding or casting, and the apertures and cavities formed by conventional machining methods. The body 1102 and the bottom cover 1104, as well as the exterior components of the solenoid and shut-off towers, may conveniently be made of materials such as metal or plastic.

Figure 2:
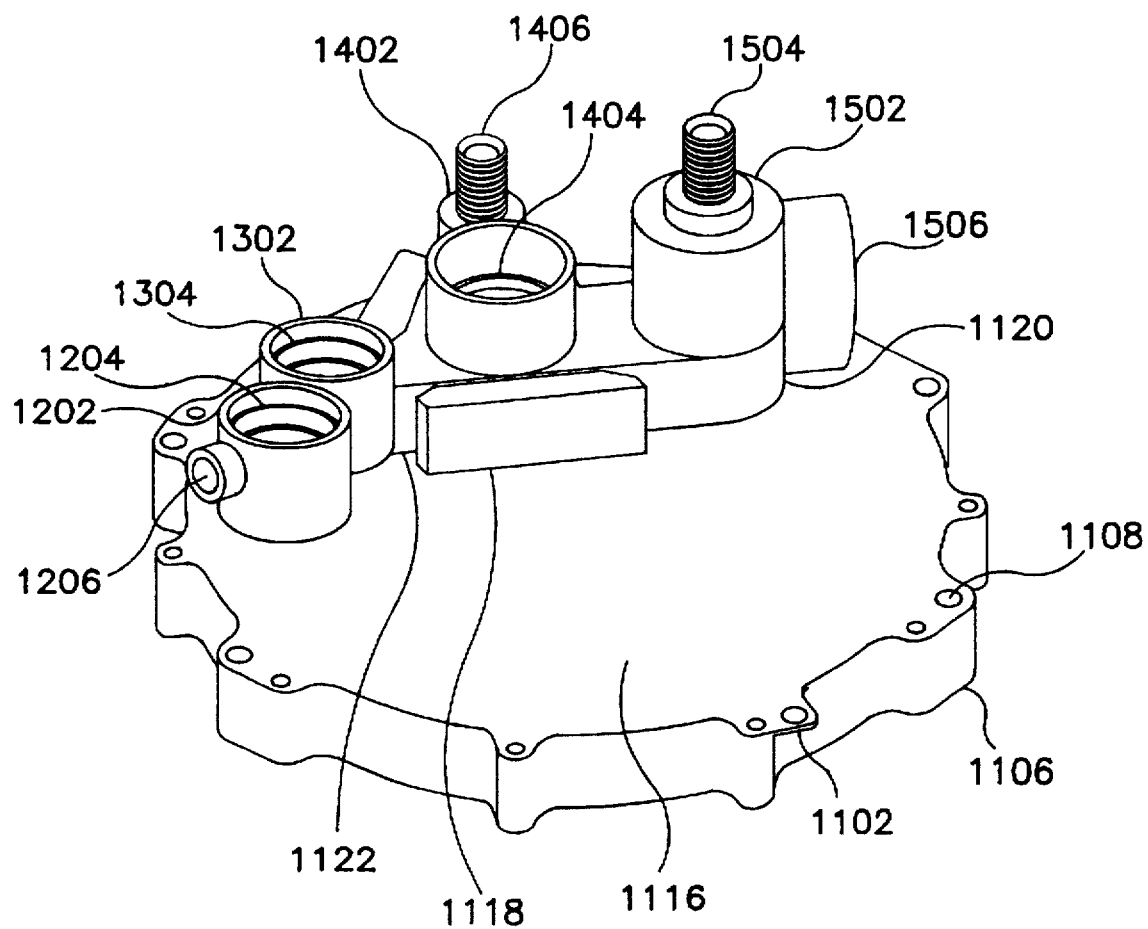
FIG. 2 is a perspective view of the outer surface of the body of the pressure regulator of the present invention.

Shown in FIG. 2 is the exterior or mounting surface body of a preferred embodiment of the supplementary pressure regulator of the present invention, generally designated as 1102. In this preferred embodiment of the invention, the regulator body has an upper surface 1116, which may be adapted to cooperate with or engage a single or multi-stage pressure regulator such as the two-stage pressure regulator shown in the aforementioned co-pending patent application. Rising vertically from the surface 1116 of the regulator body is a mounting surface 1118, in which are formed a plurality of mounting bosses 1122, which are adapted to permit secure fastening of, for example, the two-stage pressure regulator as described above, to the regulator body 1102, by any conventional, appropriate means. Formed within the vertical surface 1118 is a fuel inlet port in the form of a transfer passageway 1120 through which the gas to be regulated may pass, from the principal pressure regulator to the interior of the supplementary pressure regulator of the present invention.

Arranged on the outside surface of the regulator body 1102 are a cranking solenoid tower 1202, an idle solenoid tower 1302, a shut-off solenoid tower 1402, and a third-stage pressure adjustment tower 1406. Also arranged on the upper surface 1116 of the regulator body 1102 is a power valve adjustment tower 1502, and a power valve tower extension 1504, which has mounted therein, or integrally assembled therewith, a power valve outlet 1506.

In this embodiment of the invention, the cranking solenoid cavity 1204 and the idle solenoid cavity 1304 are formed as in the embodiment of FIG. 1, as is the third-stage shut-off solenoid cavity 1404. The power valve adjustment tower 1502 may be formed integrally with the regulator body 1102 and arranged to enable the insertion and assembly of the power valve from the interior side of the regulator body 1102.

Around the periphery of the body are mounting lugs 1106, which have in them apertures 1108 adapted to receive screws, bolts or the like (not shown).

Figure 3:
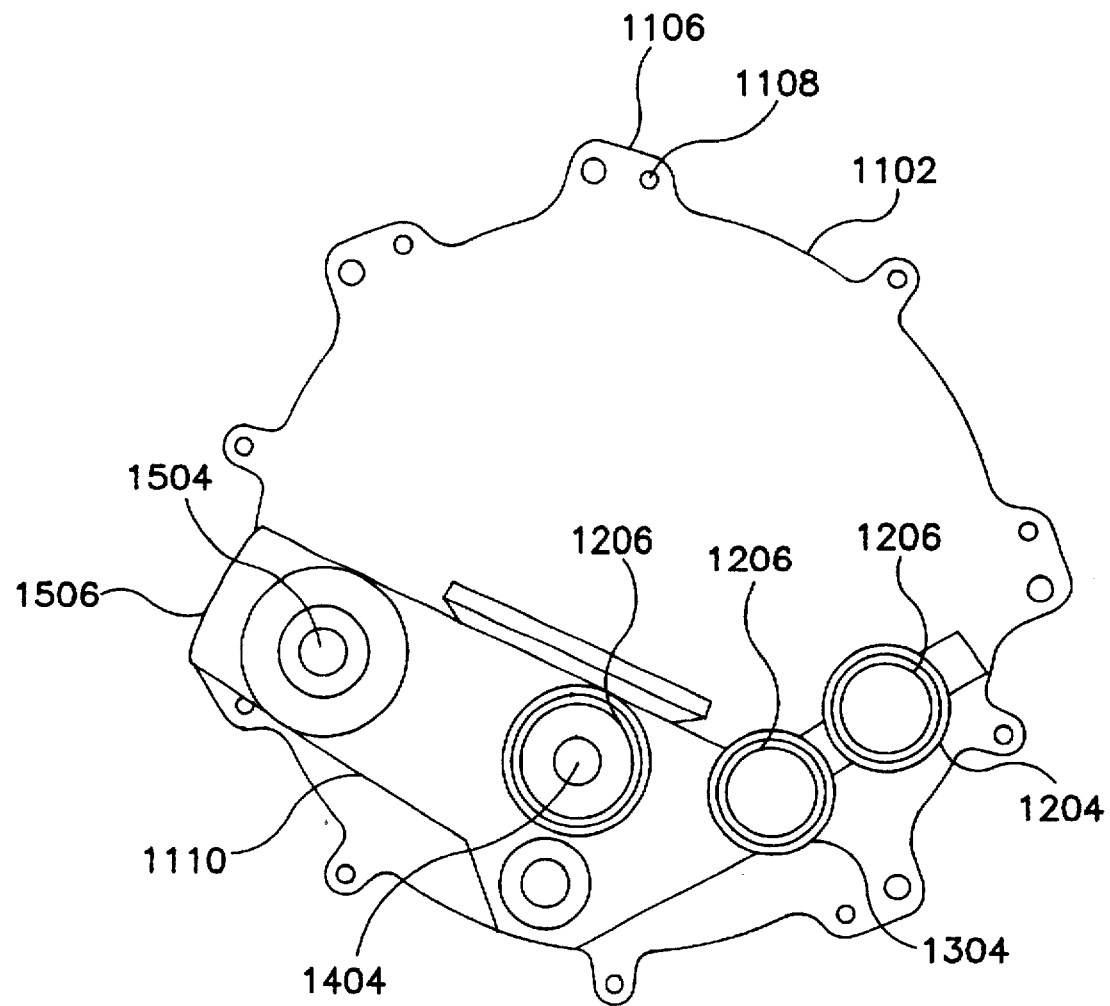
FIG. 3 is a top perspective view of the body of the pressure regulator of the present invention shown in FIG. 2.

Referring now to FIG. 3, there is shown a top perspective view of the body of the regulator of the present invention shown in FIG. 2. There can be seen in FIG. 3, in addition to the components shown in FIG. 2, a fuel temperature sensor port 1110, adapted to receive an optional, conventional fuel temperature sensor assembly (not shown). This port may be plugged if a fuel temperature sensor assembly is not used. Also shown in FIG. 3 is a fuel supply passageway 1206, which extends through the regulator body 1102 from the cranking solenoid cavity 1204, through the idle solenoid cavity 1304 to the third-stage shut-off solenoid cavity 1404, and which is adapted to enable relatively small amounts of fuel to flow from the cranking and idle solenoid assemblies to the third-stage shut-off assembly under start-up and idle conditions, respectively. As disclosed with respect to FIG. 2, a power value adjustment tower 1502 with a tower extension 1506 may be integrally moulded with the regulator body 1102.

Figure 4:
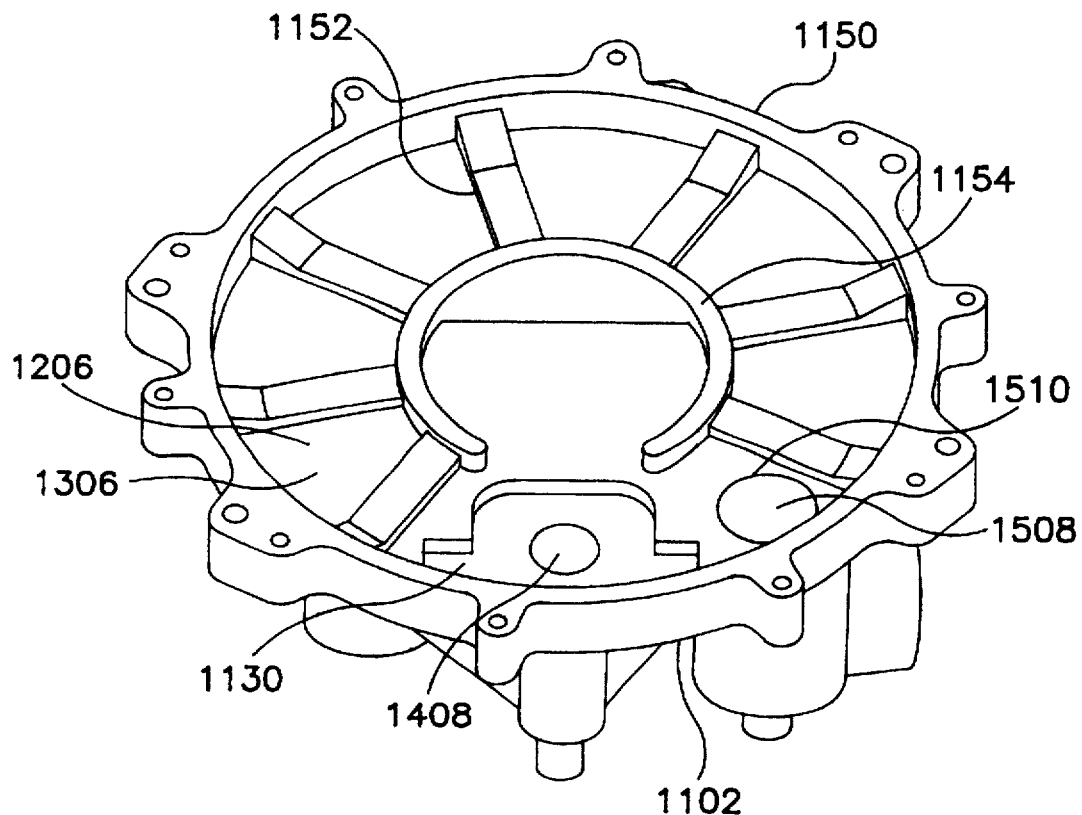
FIG. 4 is a perspective view of the interior surface of the body of the pressure regulator of the present invention.
Figure 5:
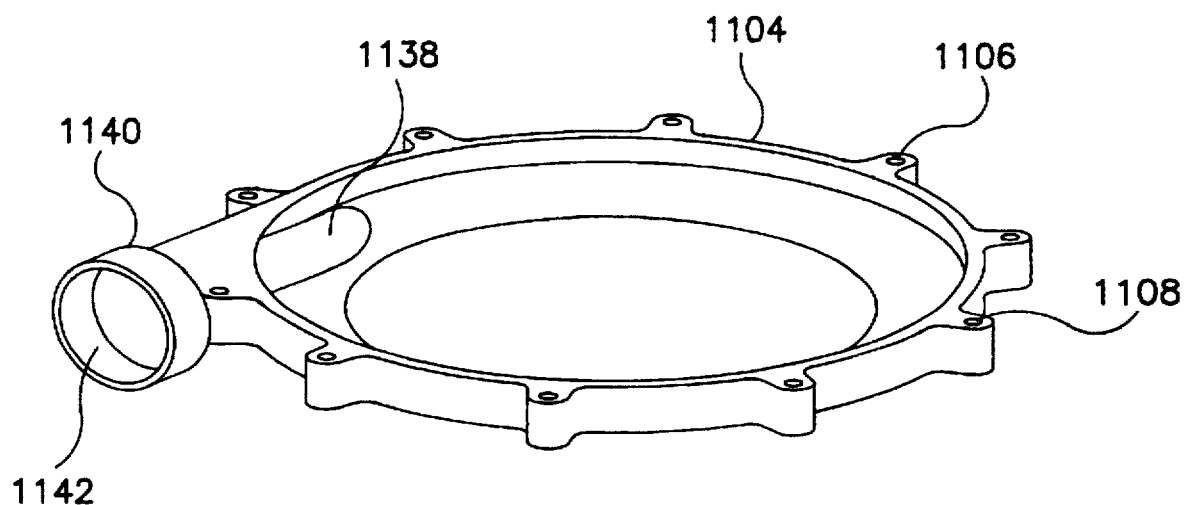
FIG. 5 is a perspective view of the interior surface of the bottom cover of the pressure regulator of the present invention.
Figure 6:
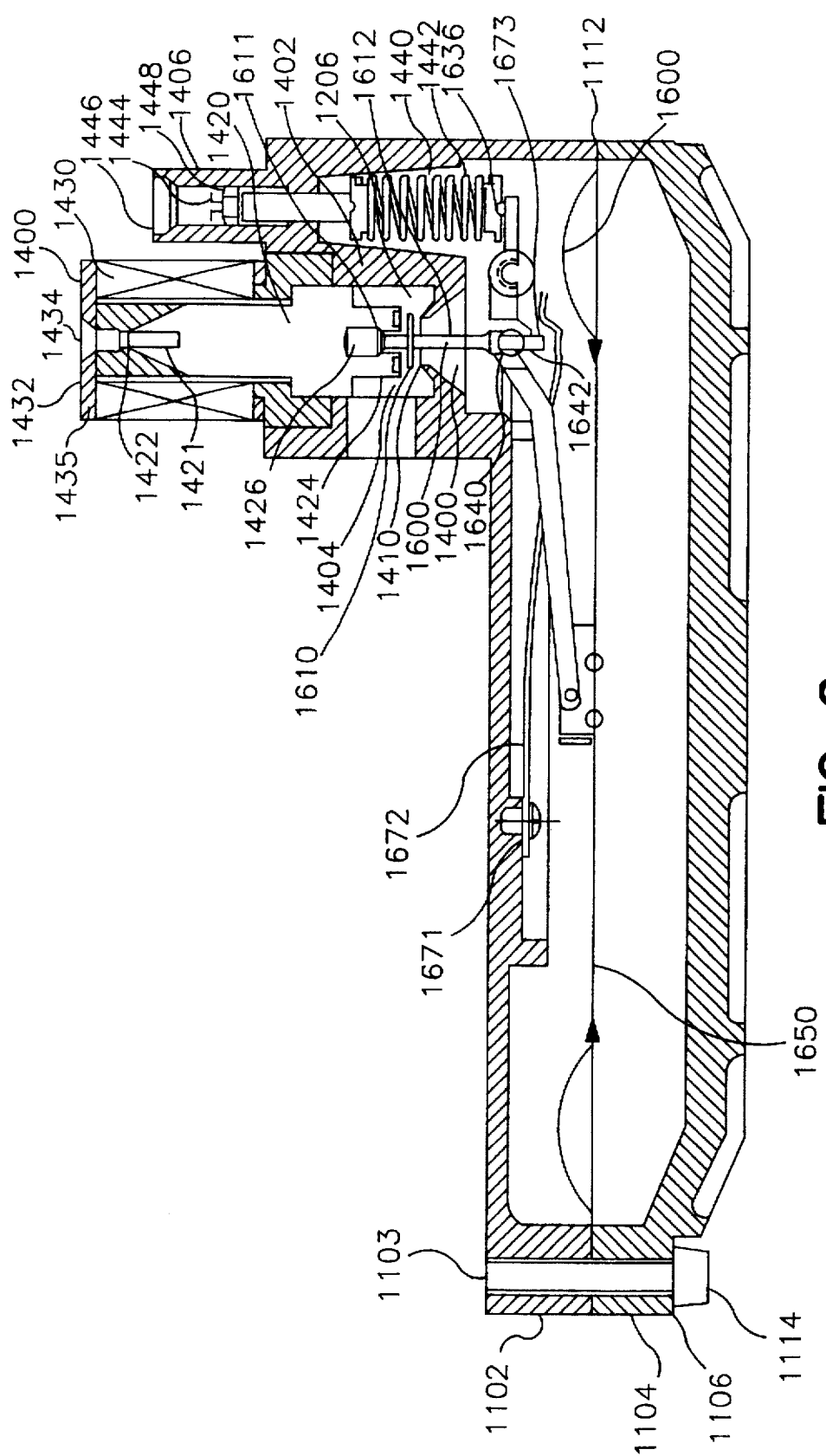
FIG. 6 is a sectional view taken along line 6—6 of FIG. 1.

FIG. 4 shows the lower side of the regulator body 1102 of FIG. 2, and, in particular, shows a circumferential rim or flange 1150 designed to cooperate with the bottom cover (shown in FIG. 5) to define an interior cavity (as shown in FIG. 6) within the regulator body, and which, when assembled with the bottom cover (shown in FIG. 5), engages and retains the edges of the regular diaphragm (not shown). The regulator body 1102 may have support ribs, 1152, which may be integral with, and reinforce the upper surface 1116 (shown in FIG. 2), and a central support rib and diaphragm stop ring 1154. Support ribs 1152 may be used to strengthen the regulatory body 1102, depending on the strength of the material used to form the regulator body. A cranking solenoid passageway 1206 extends through the surface 1116 to the cranking solenoid cavity (shown in FIG. 2) and an idle solenoid passage 1306 passes through the upper surface 1116 to communicate with the idle solenoid cavity (shown in FIG. 2).

Mounted within the body are diaphragm lever mounting blocks 1130, adapted to receive a diaphragm lever (shown in FIGS. 9A and 9B) and described in detail below.

The support ribs 1152, the central support rib and diaphragm stop ring 1154 and the diaphragm lever mounting blocks 1130 may conveniently be made integral with the regulator body 1102, and moulded or forged as part of the regulator body.

A pintle orifice 1408 communicates with the shut-off solenoid cavity, and provides an inlet means for the gas to be regulated to flow from the shut-off solenoid assembly 1400 through the pintle orifice 1408 into the cavity 1105 in the body of the regulator.

An outlet passageway 1508, which in the preferred embodiment is a passageway through the power valve assembly 1500, provided an outlet means for the pressure regulated gas to flow from the pressure regulator to the engine. Within the passageway 1508 is a power valve index channel 1510 which prevents rotation of the flow control disc, described in more detail with reference to FIG. 7.

FIG. 5 shows the bottom cover 1104 of the regulator housing of the regulator of the present invention, which, together with the regulator body 1102, defines a generally circular interior chamber or cavity 1105, shown in FIG. 6. Provided within the bottom cover is a reference pressure passageway 1138 which communicates between the interior of the regulator housing, through a reference pressure lug 1142 defined within a reference pressure port 1140. Surrounding the periphery of the bottom cover are mounting lugs 1106 corresponding to those in the regulator body, and having apertures 1108 adapted to receive screws, bolts or other like fasteners. In one preferred embodiment of the invention, the reference pressure port 1140 is of substantially the same size as the outlet passageway 1508.

FIG. 6 shows a sectional view of the regulator of the present invention, taken along line 6—6 in FIG. 1. Shown in FIG. 6 is the assembled regulator housing 1100, consisting of the upper body 1102, and the regulator bottom 1104, joined through bolts or other conventional fasteners 1114, passing through apertures 1108 in lugs 1106. Between the abutting edges of the body 1102 and the bottom 1104 there may be provided a gasket 1112 to maintain a pressure-tight seal in the housing, and to provide means for holding the diaphragm 1680, which, together with the gasket 1112, is gripped about its circumference by the abutting edges of the body 1102 and the bottom 1104. As shown in FIG. 5, there is a solenoid tower 1402, having an extension 1406 thereon. Within the tower 1402 is a cavity 1404, communicating with the second-to-third stage passageway 1120 (shown in FIG. 1), and the third-stage pintle orifice 1408. Defining the transition between the cavity 1404 and third-stage orifice 1408 is a collar 1410, shaped to receive the pintle assembly 1600, as described in more detail below, and to optimize the flow of gas between the cavity 1404 and aperture 1408.

Mounted on the solenoid tower 1402 is a shut-off solenoid assembly 1400, which consists of a solenoid-operated piston 1420, having within its upper end, a cavity 1421 adapted to receive and retain a piston return spring 1422. The solenoid operated piston 1420 is adapted to move within the cavity 1404. On the lower surface of the piston 1420 is an O-ring 1424 or other sealing means adapted to engage and provide a pressure-tight seal with the collar 1410. Within the lower end of the piston is an aperture 1426 adapted to receive the upper end of the pintle assembly 1600, described in more detail below.

The piston 1420 may be operated by a shut-off solenoid 1430, contained within a solenoid yoke 1432. The screw 1434 fastens the yoke 1432 and shut-off solenoid 1430 together, forming the shut-off assembly 1400 which provides a magnetic flux path from the top to the bottom of the coil. The regulator screw 1434 holds the yoke 1432 to the solenoid piston 1420 and thus both clamps the solenoid coil 1430 and provides a magnetic flux path from the top to the bottom of the coil.

Communicating with the cavity 1404 is the passageway 1206 from the idle solenoid cavity 1304 and the cranking solenoid cavity 1204.

Contained within the tower extension 1406 is a spring cavity 1440, adapted to receive a third-stage regulator spring 1442, which is adjustably mounted between a third-stage adjusting screw 1444 and the third-stage regulator piston 1443 which is connected to the pin 1636 of the pintle assembly 1600. The operating pressure of the regulator may be adjusted by means of a third-stage adjusting screw 1444, which is provided with an O-ring seal 1448 to ensure pressure-tight operation of the adjusting screw 1444. There is provision in the tower extension 1406 for a tamper-proof plug 1446, which may be used to prevent undesired adjustment of the upper pressure.

As shown in FIG. 6, the pintle assembly 1600 is pivotally mounted on the pintle lever mounting blocks 1130 (shown in FIG. 4).

The pintle assembly 1600 comprises a pintle 1610 pivotally mounted on a pintle lever assembly 1630, which is shown in greater detail in FIGS. 9A and 9B.

The pintle lever assembly is disclosed in detail in FIG. 9A. The pintle lever assembly 1630 comprises a pintle lever 1632 having a transverse pivot arm 1634 adapted to be pivotally mounted to pintle lever mounting blocks 1130 (shown in FIG. 4) by any conventional means. At one end of the pintle lever 1632 is a pin 1636 adapted to engage a corresponding aperture in the third-stage regulator piston 1443 (shown in FIG. 6). At the other end of the pintle arm 1632 is diaphragm pin 1638 adapted to engage the sliding coupling 1652 shown in FIGS. 10A and 10B.

On the side of the transverse pivot arm 1634 opposite the pin 1636 is an aperture 1640 in the pintle arm adapted to engage the pintle 1610, and bearing-receiving apertures 1642 which pass through the pintle lever 1632 perpendicularly to the aperture 1640.

Referring again to FIG. 6, the pintle 1610 has an aperture (not shown) in its lower end through which an axle or bearing engaged in the apertures 1642 may pass. In this way, the pintle is pivotally connected to the pintle lever 1630.

The distances between the pin 1632 and the center of the pivot arm 1634, and between the center of the pivot arm 1634 and the center of rotation of the pintle 1610, as well as the spring constants of the third-stage regulator spring 1442 and the pintle leaf spring 1672, are selected to ensure that the forces exerted by the spring 1442 and the spring 1672 balance each other at the center of rotation of pivot arm 1634.

The pintle assembly 1600 comprises a pintle stem 1612 on which is mounted a pintle flange 1610, which is adapted to engage the annular collar 1410 and the O-ring 1424 when the pintle is in a closed position, to provide a substantially pressure-tight seal. At the upper end of the pintle 1610 is a pintle head 1616 which is slidably disposed within the aperture 1426 in the piston 1420. The lower end of the pintle stem contains a circular groove 1697 which is used to retain the pin 1696. The pintle stem slides in bearing 1692 and is retained by spring 1695 and clip 1696.

The shape of the pintle 1610, of the corresponding annular collar 1410 and of the pintle orifice may be selected to provide the most efficient gas flow around the pintle 1610 and through the pintle orifice 1408. This ensures that the pressure losses as the gas flows through the regulator may be controlled to the fullest extent possible, and minimizes losses that cannot be controlled or regulated.

The spring loaded slip joint allows the pintle to slide in the pivot bearing 1642 if the force exerted on the pintle (by the pivot bearing 1642) in the closing direction exceeds the force of spring 1673, which acts as a shock absorber to cushion the relative movements of the pintle assembly 1600 and the diaphragm assembly 1650. This allows the diaphragm backing plates to contact the lower cover without exerting high forces on the backing plates, coupler, or lever in the event that excessive pressure is applied to the third-stage diaphragm (excessive pressure may be applied during an engine back-fire, a rapid decrease in flow demand, or by an installer blowing in the outlet).

The use of the slip joint also lowers the impact loading on the pintle seat when exposed to the above conditions, thereby reducing seat wear and the resulting set point drift associated with it.

Hence, incorporation of the slip joint reduces set point drift and allows the backing plates couple and pintle lever to be lighter, thereby improving transient response.

The lower end of the pintle lever 1630 engages a sliding coupling 1652 formed in the upper diaphragm backing plate 1650 as shown in FIG. 10.

A leaf spring 1672 may be mounted to the housing 1102 via screw 1671, forming a cantilever spring assembly. Deflection of the spring upon assembly applies a force to pintle stem 1612, balancing the force imparted by spring 1442 at the center of rotation, provided by the high pressure fuel against the pintle 1610.

The use of leaf spring 1672 permits the major portion of the regulating spring force to be applied directly to the base of the pintle. A minor portion of the regulating spring force is provided through spring 1442 as a means of adjusting the pressure. Leaf spring 1672 and coil spring 1442 work in parallel, and their forces on the pintle assembly are additive. By applying the majority of the force directly to the pintle, the force that must be applied by spring 1442 is substantially lower, resulting in significantly lower forces on the lever pivots. Thus, the hysteresis effect due to pivot friction is greatly reduced over that in designs which apply the regulating spring force solely to the lever. In addition, the leaf spring deflects the jet of gas (exiting from the pintle orifice) away from the diaphragm, thereby reducing or eliminating local pressure variations on the diaphragm and reducing any tendency of the diaphragm to tilt. In addition, any debris which may be entrapped in the gas stream is also directed away from the diaphragm, thereby protecting the diaphragm from perforation.

Figure 7:
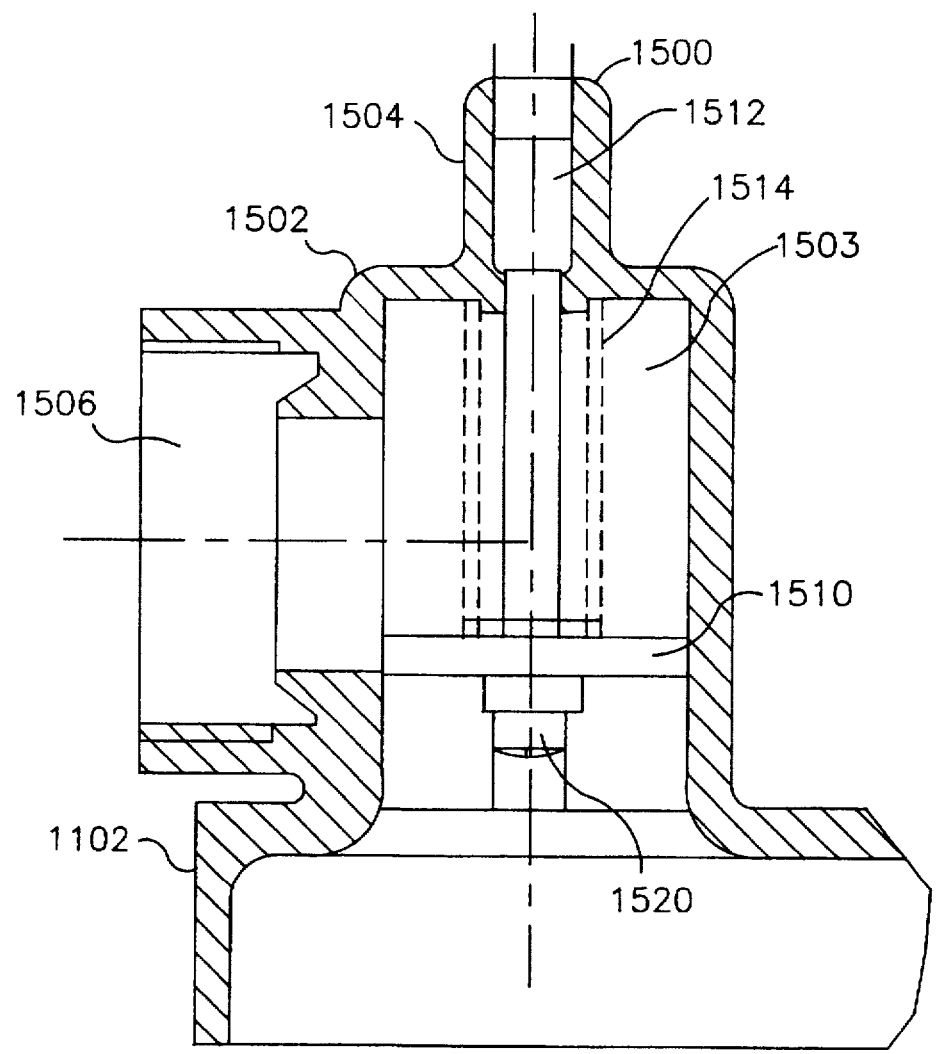
FIG. 7 is a sectional view of the power valve assembly taken along line 7—7 of FIG. 1.

One preferred form of a power valve assembly 1500 is shown in detail in FIG. 7. This assembly provides an adjustable valve to regulate the amount of fuel that enters the engine at a defined temperature and pressure. The assembly comprises a power valve tower 1502 and a power valve tower extension 1504, each of which may be integrally formed with the upper body section 1102 by, for example, moulding or casting. Within the tower 1502 is a cavity 1503. Disposed within cavity 1503 is a flow control disc 1510 axially mounted on a threaded adjusting screw 1512. The flow control disc is urged toward a closed position by means of a pre-load spring 1514. Rotation of the adjusting screw 1512 causes the flow control disc to move upwardly or downwardly within the tower 1502, thus, adjusting the size of the opening through which the pressurized fuel may pass. An end stop screw 1520 prevents the flow control disc 1510 from coming off the end of the adjustment screw 1512.

The cavity 1503 communicates with the NGV outlet 1506 which may in turn be connected to the engine by conventional means.

The end of the threaded shaft contains an O-ring to seal out the boost pressure and is seated in a taper-bottomed hole to eliminate wobble. An internal spring prevents the adjusting disc from rocking and prevents the adjusting screw from being pushed out during high boost pressure. Rotation of the adjusting disc is prevented by indexing grooves in the regulator body. This arrangement is readily adaptable to stepper motor operations.

Figure 8:
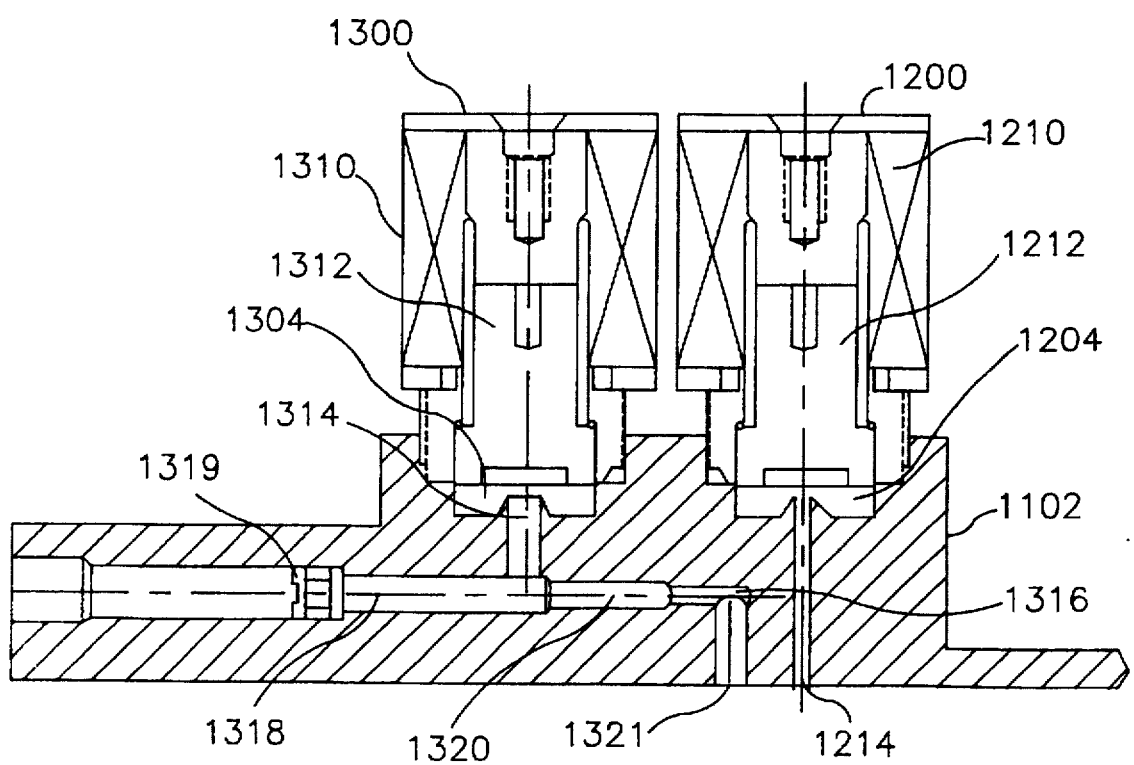
FIG. 8 is a sectional view of the idle solenoid assembly and cranking solenoid assembly, taken along line 8—8 of FIG. 1.

Referring now to FIG. 8, there are shown the cranking solenoid assembly 1200 and the idle solenoid assembly 1300. The cranking solenoid assembly 1200 is mounted above the cranking solenoid cavity 1204 in the housing 1102. Cavity 1204 is in gaseous communication, via the idle supply passageway 1206, with the third-stage shut-off solenoid cavity 1404, and the idle solenoid cavity 1304.

The cranking solenoid assembly 1200 may comprise any conventional solenoid 1210 capable of opening solenoid piston 1212 against the pressures normally encountered in the regulator. A gas flow passage 1214 connects the cranking solenoid cavity 1204 with the third-stage diaphragm cavity 1105.

The idle solenoid assembly 1300 is mounted above the idle solenoid cavity 1304, which is in gaseous communication via the idle supply passageway 1206 with the third-stage shut-off solenoid cavity 1404 and the cranking solenoid cavity 1204.

The idle solenoid assembly may comprise any conventional solenoid 1310 capable of opening solenoid piston 1312 against the pressures normally encountered in the regulator.

A gas flow passage 1314 connects the idle solenoid cavity 1304 with the idle flow adjustment cavity 1316.

Disposed within the idle flow adjustment cavity 1316 is a threaded idle flow adjustment pin 1318. The idle flow adjustment cavity 1316 is tapered, becoming progressively narrow towards the interior of the regulator. The idle flow adjustment pin 1318 has a similarly tapered end 1320, which is disposed within the idle flow adjustment cavity to provide an annular passage of adjustable size through which gas may flow. The size of the annular passage may be adjusted by turning the idle flow adjustment pin 1318, which has a threaded shaft to rotate within a threaded portion of cavity 1316, thus moving the tapered end portion in or out of the cavity 1316.

The idle flow adjustment pin 1318 regulates idle flow and has an adjustment range of 20–95 SCFH. In another embodiment of the invention, the idle flow adjustment pin 1318 could be replaced by a needle valve to adjust for low and high idle flows as required by the engine. The idle flow adjustment pin 1318 consists of a finely threaded shaft connected to a tapered pin which may be tapered at about 1.5 degrees per side. An O-ring gland is contained in the screw head 1319 to provide a seal. The orifice seat may be machined into the third-stage regulator body to reduce manufacturing costs.

Figure 11:
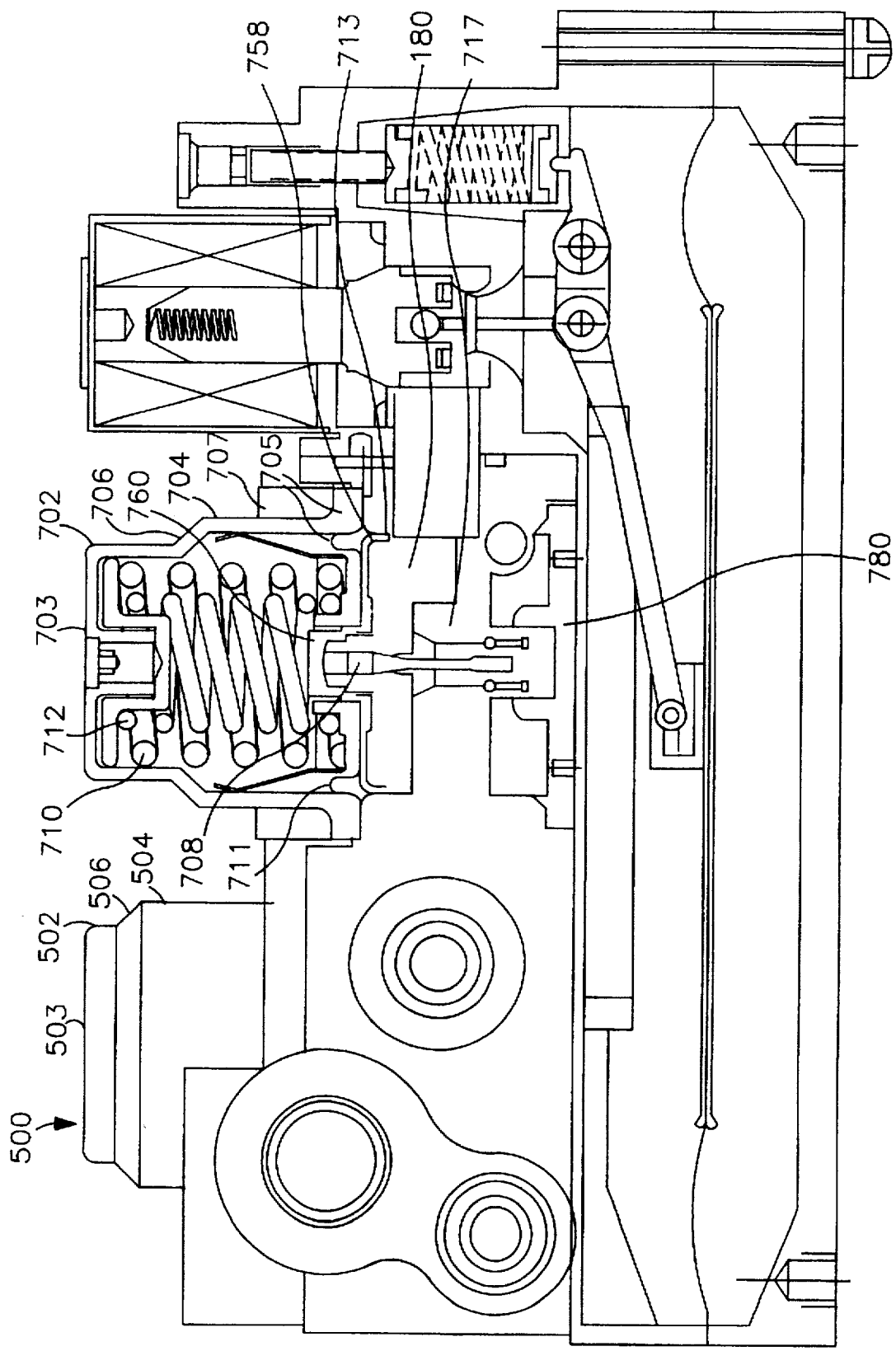
FIG. 11 is a sectional view of the supplementary pressure regulator of the present invention in one preferred embodiment, as a third stage of a three-stage pressure regulating system, taken along a line generally corresponding to line 6—6 in FIG. 1.

In FIG. 11, the supplementary pressure regulator of the present invention is shown in one preferred embodiment, used as a third stage in conjunction with a two-stage balanced pressure regulator. The first stage spring tower 500 is shown in an exterior plan view and comprises a spring tower cover 502, having an upper wall 503, and side walls 504. Between the upper wall 503 and the side walls 504 is a shoulder 506. Details of the construction of the spring tower are disclosed in aforementioned co-pending Canadian patent application.

The first stage spring tower may contain one or more springs whose spring constants are selected to give the desired outlet pressures and extend the life of the regulator and its components.

The spring tower cover 502 is adapted to be mounted on the base 100 by means of mounting bolts or other fastening mechanisms, not shown.

FIG. 11 shows a sectional view of the second stage spring tower 700, and the supplementary pressure regulator of the present invention as shown in FIG. 6. The second stage spring tower 700 comprises a spring tower cover 702, which has an upper surface 703, side walls 704 and a lower flange 705. Between the side walls 704, and the upper surface 703 is a shoulder 706. The pressure within the second stage tower is referenced to the third stage outlet pressure, which may be atmospheric pressure, by a port or opening in the cover 702, or in some other convenient location.

Within the second stage spring of the pressure regulator is a second stage pintle assembly 708. A locking ring 707 is provided to secure the second spring tower assembly to the base.

Included within the second spring tower assembly are first and second helical springs 710 and 712 respectively which are, in the preferred embodiment, wound in opposite directions. The upper ends of the springs 710 and 712 butt against a spring adjusting end cap 720, which can be displaced in a vertical direction by means of an adjusting set screw 722, thus permitting an adjustment of the force exerted by the springs 710 and 712 against the pintle assembly 708. The adjusting set screw may be protected against unauthorized adjustment by tamper proofing 724, using any of several known tamper-proofing means. The bore of this spring tower is larger than the bore of the corresponding output chamber to prevent the diaphragm piston from shearing the diaphragm if the pintle fails.

The use of two counter wound springs in the second stage tower assembly minimizes tower height and the spring constant. By minimizing spring rates for a given spring tower height, this spring configuration leads to a lower degree of uncertainty of operating pressure ("droop"). Counter winding of the springs minimizes the risk of the coils of the adjacent springs becoming interlocked during movement of the springs.

As mentioned above, the presence of the rolling convolution provides a number of advantages, including increased longevity in the working life of the diaphragm, and allows for greater tolerances in manufacturing the diaphragm. The rolling convolution also eliminates the hysteresis effect otherwise found in a flat diaphragm during operational displacement of the diaphragm. In yet another preferred embodiment, a "top hat" style diaphragm (not shown) with a longer convolution may be used in place of a diaphragm with a pre-formed convolution. This may be used to minimize the variation in the diaphragm area which may otherwise occur with changes in position of the pintle assemblies.

As shown in FIG. 11., the second stage pintle assembly consists of a diaphragm 752 generally disposed in a horizontal direction, but having a rolling convolution 711 extending upwardly from the diaphragm 752 to provide a modification in the behaviour of the diaphragm.

The diaphragm 752 is mounted on a lower diaphragm stop 758, which has a downwardly turned outer edge 713, and central boss 760 extending through the center of the diaphragm 752. The diaphragm is retained on the lower diaphragm stop by means of a diaphragm piston 754, and a locking ring 762. A spring damper 764 is retained between the locking ring 762 and the upwardly extending outer circumference of the upper diaphragm piston 754. The spring damper 764 bears against the side walls 704 of the spring tower [shown in FIG. 4] but can travel along the walls during movement of the second stage pintle assembly.

Mounted within the central boss of the lower diaphragm stop is a pintle stem 765, which may have a narrowed central portion, and a head 766 which is retained in place in the boss 760 by a pintle retainer 763. At the lower end of the first stage pintle arrangement is a valve pintle 770, threadably engaged on the pintle stem 765. About the valve pintle is a moulded rubber seal 774. The significantly lower fluid pressures in the second stage pressure chamber permit the use of a moulded rubber seal with little risk of deformation of the seal which might otherwise occur in the presence of higher fluid pressures more commonly encountered in the first stage pressure chamber. If desired, a Teflon washer can be added between the diaphragm 752 and the diaphragm piston 754 to provide enhanced protection during cold weather. The Teflon washer will slow down the heat transfer to the diaphragm 752. Alternatively, the diaphragm piston 754 and the lower diaphragm stop 758 could be ceramic coated to provide such enhanced cold weather performance. Furthermore, the configuration of the spring tower chamber (at 714) can be altered to provide a "dead gas" trap between diaphragm 752 and lower stop 758 to enhance cold weather performance.

Referring again to FIG. 1.1, the fluid under pressure enters the housing through the inlet 103 [shown in FIG. 1] and may pass through a filter assembly such as that described in the aforementioned co-pending application. The fluid enters the first stage of the pressure regulator through the inlet port (not shown), to a first stage pintle chamber, which is essentially at the pressure of the gas storage cylinder. The fluid passes in a controlled manner through the gap between the first stage pintle seal and the pintle chamber walls, and then to first stage pressure recovery section within the first stage spring tower.

The flow of the fluid through the first spring tower is regulated by the combined force exerted by the regulator springs and the diaphragm which tend to move the pintle assembly towards an open position, whereas the pressure of the fluid in the pintle chamber acting against diaphragm 552 tends to move the pintle to a closed position.

The flow of the fluid through the second stage chamber is regulated by the combined force exerted by the springs 710 and 712 and the diaphragm which tend to move the second stage pintle assembly towards an open position. The pressure of the fluid in the pintle chamber 180 acting against the diaphragm 752 provides an opposing force which tends to move the second stage pintle to a closed position. The diaphragm 752 provides a seal against the escape of the fluid up through the second stage tower, and permits a smooth vertical movement of the second stage pintle between the closed and fully opened positions. The lower diaphragm stop 758 defines the top wall of the upper portion 216 of the second stage output chamber.

A ledge 717 is provided in the output chamber 216 to engage outer edge 713 of the lower diaphragm stop 758 and thereby prevent displacement of the second stage pintle assembly beyond a set point. The second stage output chamber incorporates a spiral ramp (not shown) to further reduce droop. The ramp generates higher gas velocities and a smoother transition to the outlet. The ramp may be incorporated into the base by using forging techniques which are typically less costly than machining. The regulated fluid then passes through the output passage 156 which communicates with the outlet port 106, shown in [FIG. 1].

A removable end cap 780 is provided to enclose the lower portion of the second stage pintle chamber 180. An O-ring 782 is provided to form a seal between the regulator base 100 and the second stage end cap 780.

Figure 12:
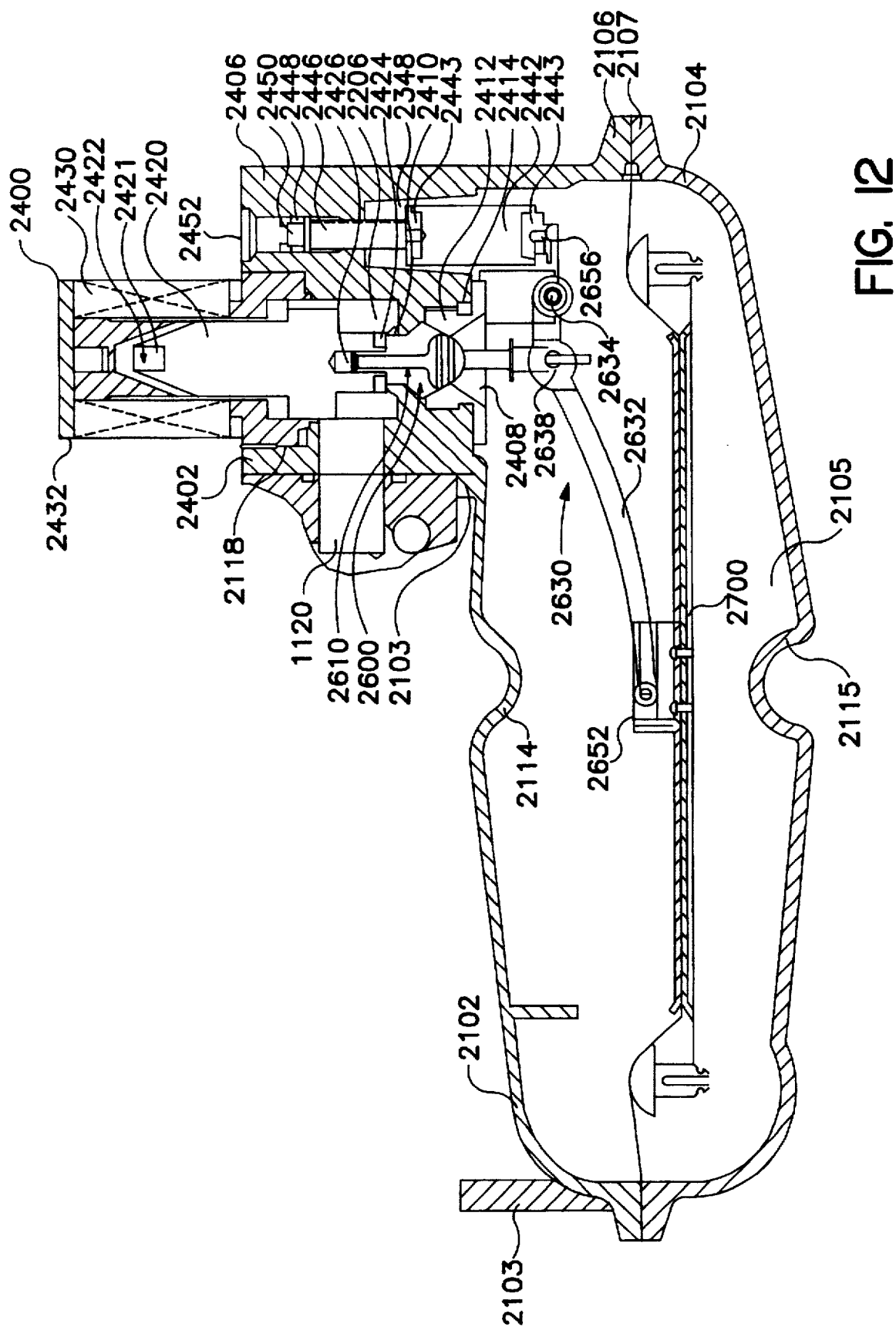
FIG. 12 is a sectional view of an alternate embodiment of the regulator of the present invention.

FIG. 12 shows a sectional view of a second embodiment of the regulator of the present invention, taken along a line generally corresponding to line 6—6 in FIG. 1. Shown in FIG. 12 is the assembled regulator housing 2100, consisting of an upper body 2102, and a regulator bottom cover 2104. Each of the regulator body 2102 and the bottom cover 2104 are generally bowl-shaped and may conveniently be manufactured of plastic or other lightweight material, in view of the relatively low pressures encountered within the regulator.

Each of the regulator body 2102 and the bottom cover 2104 may have a centrally disposed inwardly extending ridge 2114 and 2115, respectively, which serve to strengthen and reinforce the regulator body and which act as a support and stop for the diaphragm assembly 2700. The regulator body 2102 may be provided with upwardly extending support members 2103, which may be integrally moulded or formed with the regulator body 2104 and which are adapted to support a primary or two-stage regulator. The support members 2103 are adapted to hold the primary regulator (not shown) in a position substantially perpendicular to the mounting surface 2118 to ensure a substantially pressure-tight connection between the two regulators. Between the abutting edges of the body 2102 and the bottom cover 2104 there may be provided a gasket 2112 to maintain a pressure-tight seal in the housing, and to provide means for holding the outer edges of diaphragm 2680, which, together with the gasket 2112, is gripped about its circumference by the abutting edges of the body 2102 and the bottom cover 2104. In one preferred embodiment of the invention, the diaphragm 2680 and the gasket 2112 may be integrally moulded in one piece to reduce the number of parts in, and the time required to assemble, the pressure regulator of the present invention. Each of the upper body 2102 and the bottom cover 2104 have outer edges adapted to fit snugly against the corresponding outer edge of the other to form a substantially pressure-tight seal. Around the circumference of each of the upper body 2102 and bottom cover 2104 are circumferential flanges 2106 and 2107, respectively, which are adapted to receive a clamping band or other means to hold the regulator body 2102 and the bottom cover 2104 together in a substantially airtight manner.

Figure 15A:
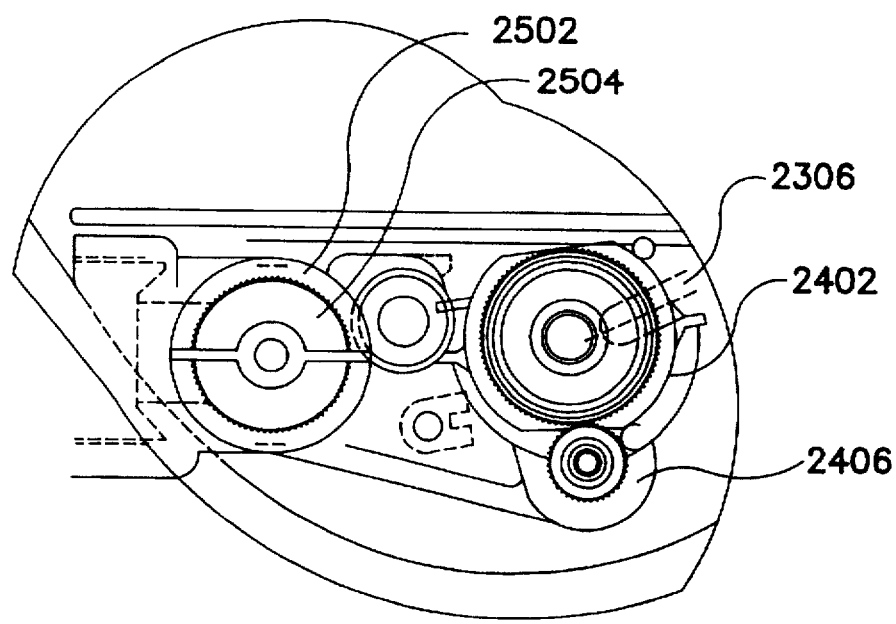
FIG. 15A is a partial plan view of the regulator of FIG. 12 showing the pressure relief valve, the fuel temperature sensor and third stage shut-off solenoid.

The regulator body 2102 includes a solenoid tower 2402, generally circular in cross-section, with an outwardly extending extension 2406, as may also be seen, for example, in FIG. 15A. The solenoid tower 2402 is adapted to receive the solenoid assembly 2400 and a regulator spring assembly 2440 as described in more detail below. Within the solenoid tower 2402 is a cavity 2406, providing an inlet to the regulator of the present invention and communicating in one embodiment with the outlet 1120 of the primary regulator (as shown in FIG. 16), and the pintle orifice 2408. Defining the transition between the cavity 2404 and pintle orifice 2408 is a collar 2410, shaped to receive the pintle assembly 2600, as described in more detail below, and to optimize the flow of gas between the cavity 2404 and pintle orifice 2408.

As will be described in more detail with reference to FIG. 14, the regulator of the present invention provides is a shut-off solenoid assembly 2400, which comprises a solenoid-operated piston 2420, having within its upper end, a cavity 2421 adapted to receive and retain a piston return spring 2422. The solenoid operated piston 2420 is adapted to move within the cavity 2404. On the lower surface of the piston 2420 is an O-ring 2424 or other sealing means adapted to engage and provide a pressure-tight seal with the collar 2410. Within the lower end of the piston is an axial aperture 2426 adapted to receive the upper end of the pintle assembly 1600, described in more detail below.

The piston 2420 may be operated by a shut-off solenoid 2430, contained within a solenoid yoke 2432. The regulator screw 2434 holds the yoke 2432 to the solenoid piston 2420 and thus both clamps the solenoid coil 2430 and provides a magnetic flux path from the top to the bottom of the coil.

Communicating with the cavity 2406 is a fuel supply passageway 2206 from the idle solenoid cavity 2304 and the cranking solenoid cavity 2204.

The lower section of the pintle orifice 2408 is defined and shaped by an insert 2412, which may be made of metal to provide a durable surface over which the gas may flow, and which may be retained in the regulator body 2102 by threads or other conventional means. Provision of such an insert maintains the durable and form-retaining surface required to define the pintle orifice, while permitting much of the remainder of the regulator to be made of low-cost, lightweight materials. The insert 2412 and the pintle assembly 2600 are configured to provide the desired characteristics to the gas flow through the regulator, as described in more detail below.

Within the tower extension 2406 is a regulator spring assembly 2440, comprising regulator spring 2442, which has spring caps 2443 at each end thereof. The regulator spring 2442 is disposed between a regulator piston 2446 and a pin 2636 mounted on the pintle assembly 2600. Spring caps 2443 engage the regulator piston 2446 and the pin 1636 respectively. Regulator piston 2446 is disposed within the spring cavity 2438 and held by regulator spring 2442 against adjusting screw 2450. Adjusting screw 2450 is threadably received at the upper end of cavity 2438; its position within that cavity may be adjusted by rotating the screw to move it up or down within the cavity 2438. The operating pressure of the regulator may thus be adjusted by the adjusting screw 2450, which is provided with an O-ring seal 2448 to ensure pressure-tight operation of the adjusting screw 2450. A tamper-proof plug 2452 may be used in the tower extension 2406 to prevent undesired adjustment of the upper pressure.

Figure 16A:
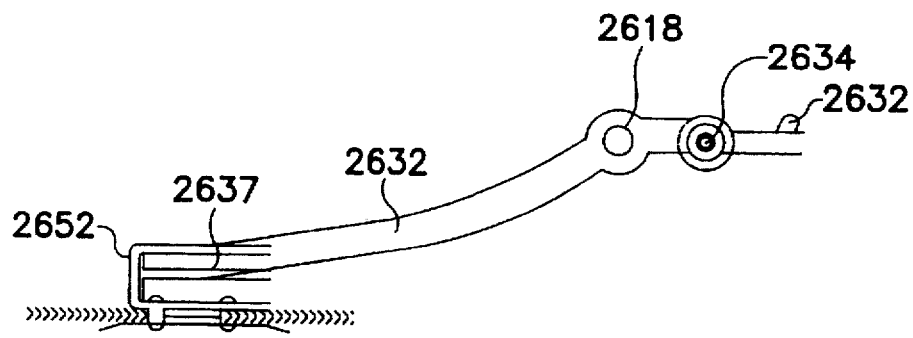
FIG. 16A is a side elevation view of the diaphragm lever assembly of the embodiment of FIG. 12.

As shown in FIG. 12, the pintle assembly 2600 is a pintle 2610 pivotally mounted on a pintle lever assembly 2630, which is shown in detail in FIGS. 16A and 168.

Figure 14:
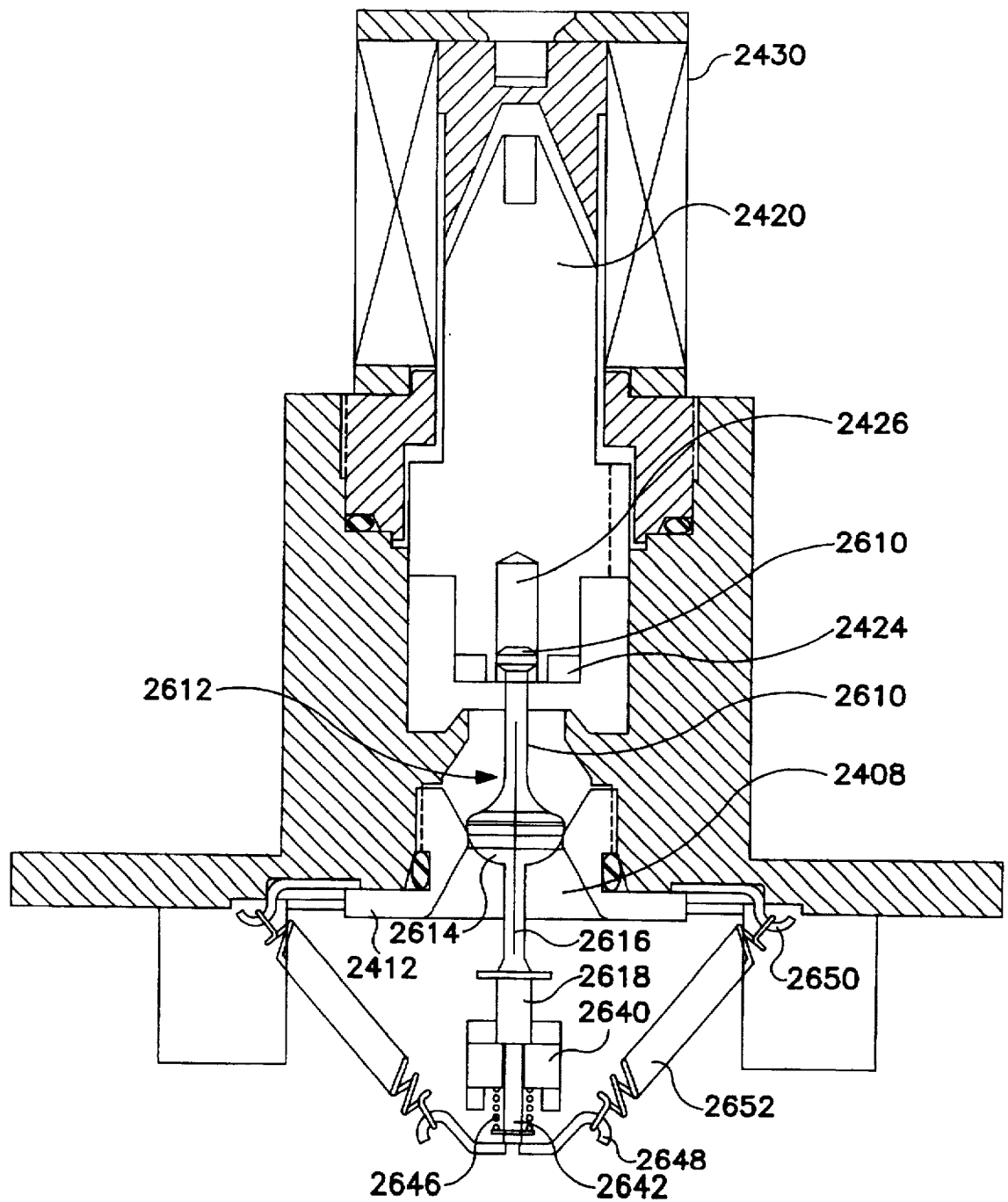
FIG. 14 is a sectional view of a preferred shut-off solenoid assembly which may be used in the pressure regulator of the present invention.

The pintle 2610 is shown more clearly in FIG. 14, and comprises a pintle stem 2612 which merges smoothly into a pintle base 2614, which is adapted to interact with the insert 2412. A solenoid piston 2420 has an O-ring seal 2424 which provides a substantially pressure-tight seal between the solenoid piston 2420 and the collar 2410 when the pintle is in a closed position. At the upper end of the pintle 2610 is a pintle head 2616 which is slidably disposed within the aperture 2426 in solenoid piston 2420. Below the pintle base 2614 is a lower pintle stem 2616 to which is fastened a pintle support pin 2618, which rests on, and is supported by, the pintle lever assembly 2630 as described in more detail below.

The shapes of the pintle 2610, of the corresponding annular collar 2410 and of the pintle orifice insert 2412 may be selected to provide the most efficient gas flow around the pintle 2610 and through the pintle orifice 2408. This ensures that the pressure losses as the gas flows through the regulator may be controlled to the fullest extent possible, and minimizes any pressure losses that cannot be controlled or regulated.

Figure 16B:
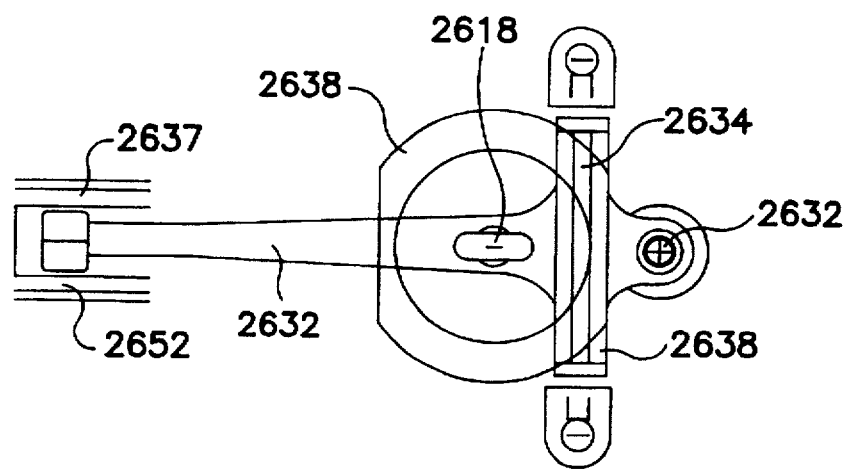
FIG. 16B is a plan view of the diaphragm lever assembly of the embodiment of FIG. 12.
Figure 16C:
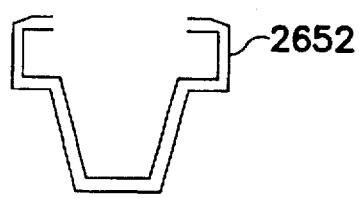
FIG. 16C is an end view of the pintle slide coupler used in the preferred diaphragm assembly of FIGS. 13A—13C.

The pintle lever assembly 2630 is disclosed in detail in FIGS. 16A and 16B. The pintle lever assembly 2630 comprises a pintle lever 2632 having pivotally mounted, adjacent to one end, on a mounting pin 2634. At that end of the lever 2632 is a support pin 2636 adapted to engage a corresponding aperture in spring cap 2443. Mounted at the other end of the pintle arm 2632 is coupling pin 2637 adapted to engage the sliding coupling 2652 shown in FIGS. 16B and 16C.

As shown in FIGS. 16A and 16B, the pintle support lever 2632 has mounted thereon on the side of a pintle guide assembly 2638 which is adapted to support the pintle support pin 2618, which rests on the pintle guide assembly 2638.

As shown in greater detail in FIG. 14, the pintle guide assembly 2638 includes lateral supports 2640, a central shaft 2642, a spring support 2644, and a spring 2646.

Mounted at the bottom of the shaft 2642 are spring hooks 2648. Corresponding spring hooks 2650 are retained at the bottom of the solenoid tower 2402 on either wide of the pintle orifice 2408 by the insert 2412. Mounted between corresponding pairs of spring hooks 2648 and 2650 are pintle support springs 2652.

The distances between the pin 2636 and the center of the pivot lever pin 2634, and between the center of the pivot arm 2634 and the center 2618 of the pintle guide assembly, as well as the spring constants of the regulator spring 2442, the pintle support springs 2652 and the spring 2646, are selected to ensure that the force exerted by the springs 2442, 2646 and 2652 balance the force exerted by high pressure fuel against the pintle 2610.

The spring 2646 pushes upward against the pintle assembly 2610 and normally holds the pintle assembly 2610 away from the pintle lever assembly 2630, and permits the lever assembly to continue moving downwardly even after the pintle base 2614 is completely seated in the insert 2412, and the pintle orifice 2408 completely closed. This allows the diaphragm backing plates to contact the lower cover without exerting high forces on the backing plates, coupler, or lever in the event that excessive pressure is applied to the third-stage diaphragm. Such excessive pressure may be applied during an engine back-fire, a rapid decrease in flow demand, or by an installer blowing in the outlet. This permits the use of lighter materials in the construction of the lever assembly 2630.

The use of the spring 2646 also lowers the impact loading on the pintle seat when exposed to the above conditions, thereby reducing seat wear and the resulting set point drift associated with it.

Incorporation of the spring 2646 reduces set point drift and allows the backing plates, and pintle lever assembly to be lighter, thereby improving the transient response of the regulator.

The lower end of the pintle lever 2632 engages a sliding coupling 2652 formed in the upper diaphragm backing plate 2704 and operates in the same manner as the sliding coupling shown in FIG. 10.

The use of pintle springs 2652 permits the major portion of the regulating spring force to be applied directly to the base of the pintle 2610. A minor portion of the regulating spring force is provided through regulator spring 2442 as a means of adjusting the pressure acting upwardly on the pintle. Springs 2652 and spring 2442 work in parallel, and their forces on the pintle assembly are additive. As is the case with the embodiment of FIG. 6, by applying the majority of the force directly to the pintle, the force that must be applied by spring 2442 is substantially lower than that applied in conventional pressure regulators, resulting in significantly lower forces on the lever pivots. Thus, the hysteresis effect due to pivot friction is greatly reduced over that in designs which apply the regulating spring force solely to the lever.

FIG. 14 shows a section view of the solenoid tower of FIG. 12, taken at right angles to the section view of FIG. 12. As shown in FIG. 14, the pintle assembly 2600 is supported not only by the pintle lever assembly 2630, but also by springs 2652 which are engaged on spring mounting hooks 2648 and 2650. Thus the downward force of gas flowing through the pintle orifice 2408 may be balanced against the upward forces provided by springs 2652, and regulator spring 2442.

Figure 15B:
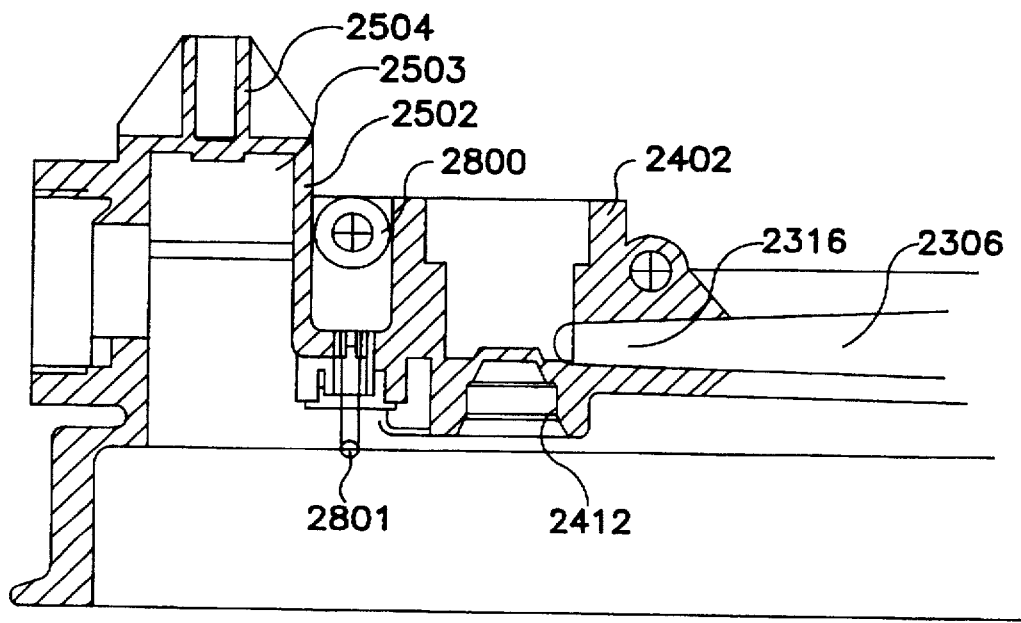
FIG. 15B is a sectional view along line E—E of FIG. 15A showing the construction of the pressure relief valve, the fuel temperature sensor and the third stage shut-off cavity of the regulator of FIG. 12.

An alternate and preferred power valve assembly 2500 is shown in detail in FIGS. 15A and 15B. This assembly provides an adjustable valve to regulate the amount of fuel that enters the engine at full power, and to ensure that the outlet flow is turbulent at all flow rates. The power valve assembly 2500 is mounted in a power valve tower 2502 and a power valve tower extension 2504, which may be integrally formed with the upper body section 2102 by, for example, moulding or casting. Within the tower 2502 is a generally cylindrical cavity 2503. The cavity 2503 communicates with the NGV outlet 2506 which may in turn be connected to the engine by conventional means. Disposed within cavity 2503, perpendicular to the longitudinal axis of the cavity, is a flow control disc 2510 axially mounted on a threaded adjusting screw 2512 [not shown on drawing]. The flow control disc is urged toward a closed position by means of a pre-load spring 2514. The upper end of adjusting screw 2512 is exposed through the upper end of the power valve assembly and may be rotated to cause the flow control disc to move upwardly or downwardly within the tower 2502, thus, adjusting the size of the opening through which the pressurized fuel may pass. An end stop screw 2520 prevents the flow control disc 2510 from coming off the end of the adjustment screw 2512.

The end of the threaded shaft contains an O-ring to seal out the boost pressure and is seated in a taper-bottomed hole to eliminate wobble. An internal spring prevents the adjusting disc from rocking and prevents the adjusting screw from being pushed out during high boost pressure. Rotation of the adjusting disc is prevented by indexing grooves in the regulator body. This arrangement is readily adaptable to stepper motor operations [more details and numbers needed in drawing].

Shown in FIG. 15B is a sectional view of the solenoid tower 2402 and the pintle orifice 2408 with the collar insert 2410. Shown in FIG. 15B are the spring mounting hooks 2650 on which the pintle support springs 2652 are mounted.

Also shown in FIG. 15B is a temperature sensor port 2800 which has a thermistor 2801 mounted thereon, with the temperature sensing end of the thermistor extending into the cavity 2408 in the pressure regulator.

Also shown in FIGS. 15A and 15B is the idle supply passageway 2306, which connects the idle solenoid cavity 2304 with the third-stage shut-off solenoid cavity 2404 and the cranking solenoid cavity 2404.

In a manner similar to that of the embodiment of FIG. 8, a gas flow passage connects the idle solenoid cavity in the idle solenoid tower 2302 with the idle flow adjustment cavity 2316.

At the end of the idle supply passageway 2306 is an idle flow adjustment cavity 2316. Disposed within the idle flow adjustment cavity 2316 is a threaded idle flow adjustment regulator (not shown in FIG. 15B but similar to that shown in FIG. 8). The idle flow adjustment cavity 2316 is tapered, becoming progressively narrow towards the interior of the regulator. As shown in FIG. 8, the idle flow adjustment pin 1318 (in FIG. 8) has a similarly tapered end 1320 (in FIG. 8), which is disposed within the idle flow adjustment cavity to provide an annular passage of adjustable size through which gas may flow. The size of the annular passage of the embodiment of FIG. 15B may be adjusted by turning the idle flow adjustment pin 2318, which has a threaded shaft to rotate within a threaded portion of cavity 2316, thus moving the tapered end portion in or out of the cavity 1316.

Figure 13A:
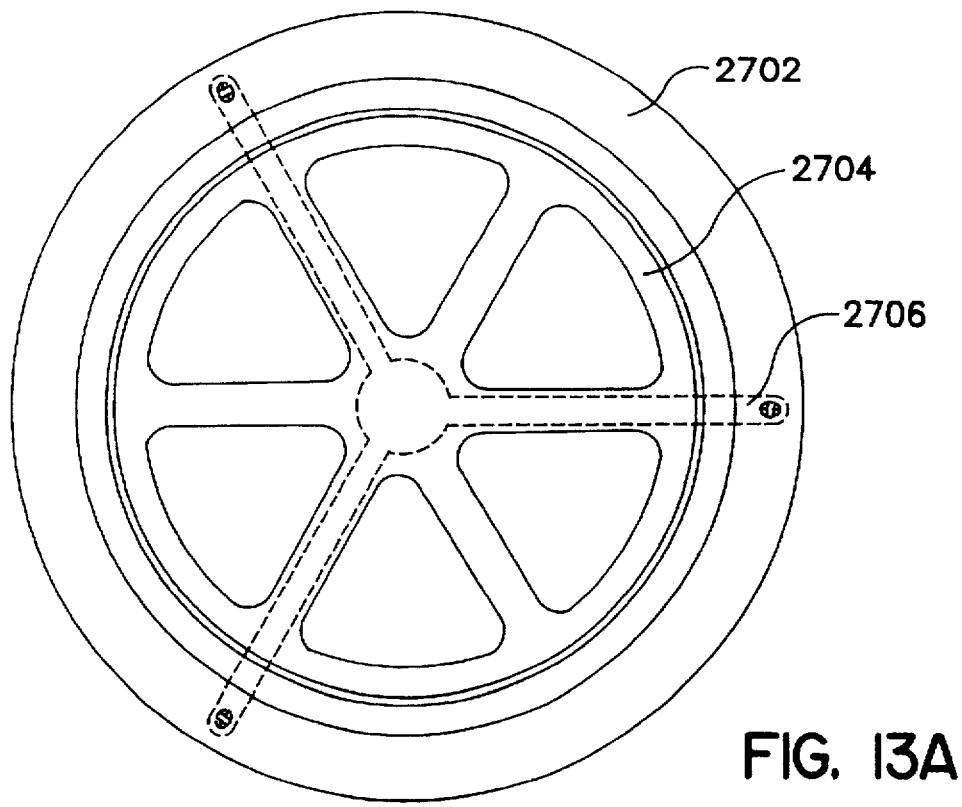
FIG. 13A is a plan view of a preferred diaphragm assembly used in the embodiment of FIG. 12.
Figure 13B:
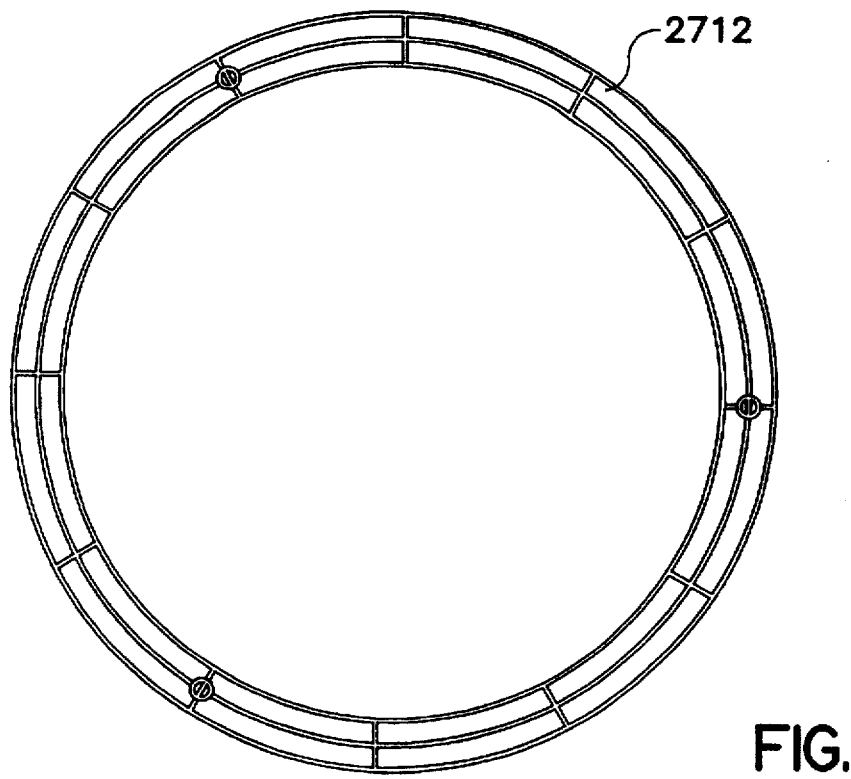
FIG. 13B is a plan view of an anti-wrinkle ring used in a preferred diaphragm assembly of the present invention.
Figure 13C:
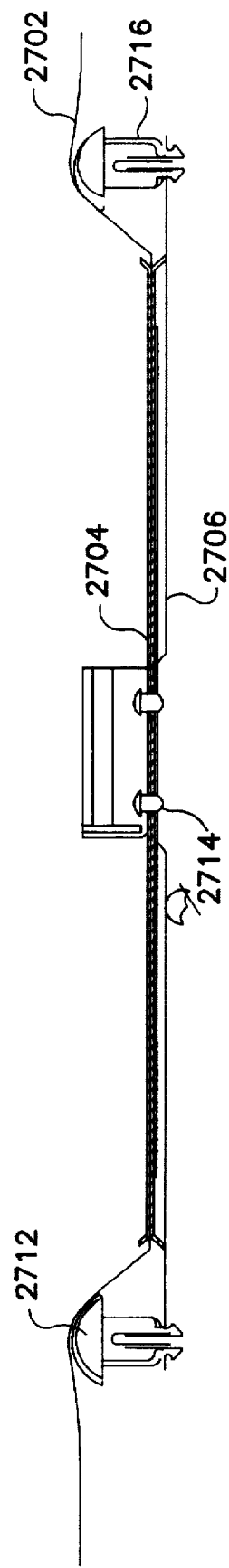
FIG. 13C is a sectional view of a preferred diaphragm assembly which may be used in the embodiment of FIG. 12.

Shown in FIGS. 13A, 13B and 13C is an especially preferred diaphragm assembly 2700 which may be used in the embodiments of the regulator shown in FIG. 12.

The diaphragm assembly 2700 comprises a diaphragm 2702 which may be made of any conventional materials whose outer edges are held securely between the regulator body 2102 and the bottom cover 2104 (as shown in FIG. 12) and includes an integral, moulded gasket. Above the diaphragm is a diaphragm backing plate 2704 to which is mounted the sliding coupling 2652 as shown in FIG. 12.

Below the diaphragm is a diaphragm spring 2706 and an anti-wrinkle ring 2712. The backing plate 2704, diaphragm spring 2706, and anti-wrinkle ring 2712 are joined together by rivets 2714 or other lightweight fasteners that pass through the diaphragm 2702 but still permit a substantially air-tight separation between the upper and lower portions of the regulator cavity. The diaphragm spring 2706 may comprise three or more fingers extending outwardly from a central hub and adapted to support the anti-wrinkle ring in the manner described below.

The backing plate 2704 may be a relatively flat lightweight piece of metal or plastic, configured with spokes and a continuous outer circumference to keep the mass of the backing plate as low as possible while keeping the central portion of the diaphragm 2702 relatively flat and parallel to the central axis of the regulator body.

Similarly, the anti-wrinkle ring 2712 has a circular outer ring 2710 of a diameter greater than that of the backing plate 2704, which is mounted on elevating pins 2716 at the end of spring fingers 2706. The outer ring raises the diaphragm edges above the height of the central portion of the diaphragm in the regulator's normal or balanced position. If the pressure in the upper portion of the cavity 2105 drops below the reference pressure in the lower portion of the cavity, the central portion of the diaphragm will move up to compensate for these pressure differences. The novel construction of the diaphragm of the present invention keeps the diaphragm flat and improves the operation of the regulator.

While in many cases it will be preferred to operate the regulator in a balanced position, to minimize the outlet pressure of the gas, there are circumstances in which the regulator may be operated in an unbalanced position to ensure that there is a small, positive outlet pressure from the regulator to the engine.

Figure 17:
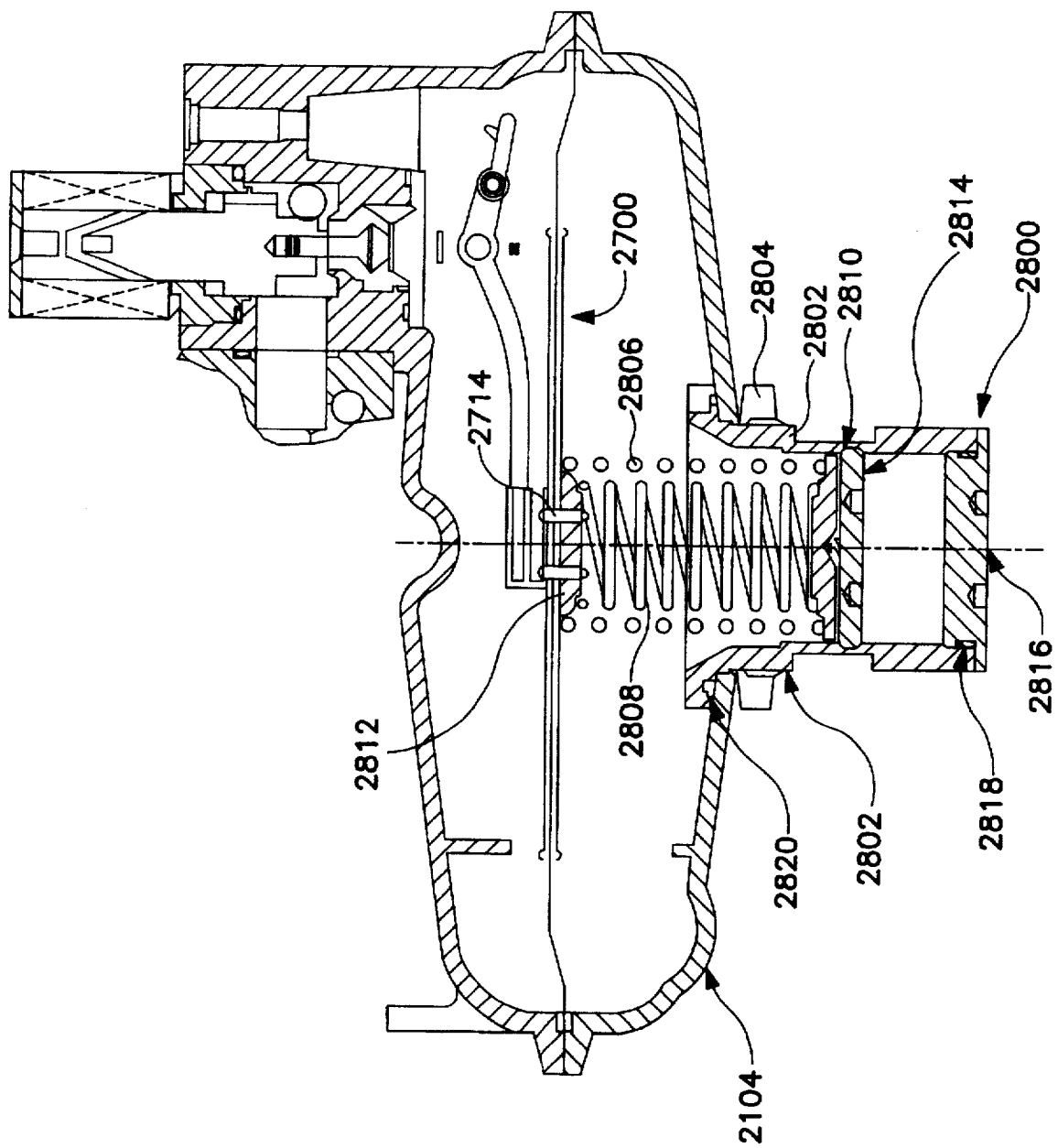
FIG. 17 is a sectional view of another embodiment of the regulator of the present invention taken along a line generally corresponding to line 6—6 in FIG. 1.

Shown in FIG. 17 is the pressure regulator of FIG. 12 adapted to ensure a positive output pressure from the regulator. Mounted on the bottom cover of the pressure regulator is a spring tower assembly 2800 comprising a sleeve 2802 mounted in the bottom cover and held in place by a nut 2804. Within the sleeve 2802 are counter-wound springs 2806 and 2808 retained between spring plates 2810 and 2812. Spring plate 2812 is fastened to the diaphragm assembly 2700 by rivets 2714, while spring plate 2810 is retained within sleeve 2802 and abuts against a spring adjusting disc 2814, which is threadedly received in the sleeve 2802. Rotating the spring adjusting disc 2814 increases or decreases the spring force applied against the diaphragm assembly 2700. A tamper-proof cap 2816 may be provided at the end of the sleeve 2802. O-rings 2818 and 2820 seal the regulator against the effects of ambient pressure.

What is claimed is:

1. A pressure regulator comprising:
   (a) a housing comprised of first and second housing members;
   (b) a diaphragm disposed within said housing between said first and second housing members;
   (c) a lever assembly pivotally mounted on said first housing member, one end of said lever assembly being hingedly connected to said diaphragm;
   (d) valve means for regulating the flow of fluid into said housing, said value means, comprising a pintle assembly pivotally mounted on said lever assembly; and
   (e) spring means engaging the other end of said lever assembly and acting to urge said valve means into an open position.

2. A pressure regulator comprising:
   (a) a housing comprised of first and second housing members;
   (b) a diaphragm disposed within said housing between said first and second housing members, said diaphragm and said first housing member defining a first chamber within said housing, and said diaphragm and said second housing member defining a second chamber within said housing;
   (c) a lever assembly pivotally mounted on said first housing member, said lever assembly comprising a lever arm having first and second ends, the first end of said lever arm being hingedly connected to said diaphragm;
   (d) valve means located in said first housing member for regulating the flow of fluid into said housing, said value means comprising a pintle assembly pivotally mounted on said lever and being disposed within an aperture in said first housing member; and
   (e) spring means mounted on said first housing member engaging the second end of said lever arm and acting to urge said valve means into an open position.

3. A pressure regulator adapted to regulate and control the flow of pressurized fluid to an engine, comprising:
   (a) a housing comprised of first and second housing members;
   (b) a diaphragm disposed within said housing and between said first and second housing members, said diaphragm and said first housing member defining a first chamber within said housing, and said diaphragm and said second housing member defining a second chamber within said housing;
   (c) said first housing member having an inlet port adapted to communicate with a source of high pressure fluid, and said second housing member having a reference port adapted to communicate with a source of reference pressure;
   (d) a lever assembly pivotally mounted on said first housing member, said lever assembly comprising a lever arm having first and second ends, and the first end of said lever arm being hingedly connected to said diaphragm;
   (e) valve means disposed between said inlet port and said first chamber for regulating the flow of fluid into said housing, said value means comprising a pintle assembly pivotally mounted on said lever and a valve seat adapted to cooperate with said pintle assembly to interrupt the flow of fluid from said inlet port to said first chamber when the flow of fluid to said engine is not required; and
   (f) spring means engaging the second end of said lever arm and acting to urge said valve means into an open position.

4. The pressure regulator of claim 3, wherein said first chamber and said second chamber are of substantially the same volume.

5. The pressure regulator of claim 3, wherein said inlet port and said outlet port are substantially the same size.

6. The pressure regulator of claim 3, wherein said valve means further includes means adapted to retain said pintle assembly in a closed position.

7. A pressure regulator comprising:
   (a) a housing comprised of first and second housing members;
   (b) a diaphragm disposed within said housing and between said first and second housing members, said diaphragm and said first housing member defining a first chamber within said housing, and said diaphragm and said second housing member defining a second chamber within said housing;
   (c) a lever assembly pivotally mounted on said first housing member, said lever assembly comprising a lever arm having first and second ends, the first end of said lever arm being hingedly connected to said diaphragm;
   (d) valve means for regulating the flow of fluid into said housing, said value means comprising a pintle assembly pivotally mounted on said lever; and
   (e) spring means engaging the second end of said lever arm and acting to urge said valve means into an open position.

* * * * *